US007674176B2

(12) United States Patent
Berman et al.

(10) Patent No.: US 7,674,176 B2
(45) Date of Patent: Mar. 9, 2010

(54) GAMING USING DISPLAY ELEMENTS ACTIVATED BY DIRECTION INDICATORS

(75) Inventors: Bradley Berman, Minnetonka, MN (US); Adam Martin, St. Louis Park, MN (US)

(73) Assignee: King Show Games, Inc., Minnetonka, MN (US)

( * ) Notice: Subject to any disclaimer, the term of this patent is extended or adjusted under 35 U.S.C. 154(b) by 551 days.

(21) Appl. No.: 11/707,256

(22) Filed: Feb. 13, 2007

(65) Prior Publication Data

US 2007/0232383 A1 Oct. 4, 2007

Related U.S. Application Data

(60) Provisional application No. 60/772,742, filed on Feb. 13, 2006.

(51) Int. Cl.
*A63F 13/00* (2006.01)

(52) U.S. Cl. .............................. 463/20; 463/16; 463/21; 273/138.1; 273/141 R; 273/143 R

(58) Field of Classification Search .................. 463/16, 463/20, 21, 26, 27, 13, 25; 273/138.1, 143 R, 273/141 R
See application file for complete search history.

(56) References Cited

U.S. PATENT DOCUMENTS

| | | | | |
|---|---|---|---|---|
| 6,089,977 | A * | 7/2000 | Bennett | 463/20 |
| 6,517,432 | B1 * | 2/2003 | Jaffe | 463/16 |
| 6,565,433 | B1 * | 5/2003 | Baerlocher et al. | 463/20 |
| 6,780,105 | B1 | 8/2004 | Kaminkow | |
| 6,780,109 | B2 * | 8/2004 | Kaminkow | 463/20 |
| 6,805,349 | B2 * | 10/2004 | Baerlocher et al. | 273/138.2 |
| 6,866,583 | B2 | 3/2005 | Glavich et al. | |
| 6,905,406 | B2 * | 6/2005 | Kaminkow et al. | 463/20 |
| 6,921,335 | B2 * | 7/2005 | Rodgers et al. | 463/30 |
| 6,939,228 | B2 * | 9/2005 | Shimizu | 463/20 |
| 6,958,013 | B2 * | 10/2005 | Miereau et al. | 463/16 |
| 7,056,213 | B2 * | 6/2006 | Ching et al. | 463/20 |
| 7,070,530 | B2 | 7/2006 | Ai et al. | |
| 7,169,042 | B2 | 1/2007 | Muir et al. | |
| 2003/0060259 | A1 * | 3/2003 | Mierau et al. | 463/16 |
| 2004/0048646 | A1 * | 3/2004 | Visocnik | 463/16 |
| 2004/0127280 | A1 * | 7/2004 | Moody | 463/20 |
| 2004/0171423 | A1 | 9/2004 | Silva et al. | |

* cited by examiner

*Primary Examiner*—James S. McClellan
*Assistant Examiner*—Brandon Gray
(74) *Attorney, Agent, or Firm*—Hollingsworth & Funk, LLC

(57) ABSTRACT

Gaming systems/processes employing display elements activated by direction-indicating symbols from adjacent display elements. A slot game event provides a display grid having deactivated grid positions and at least one activated grid position. A direction-indicating symbol is randomly presented in the activated grid position, indicating the direction of a deactivated grid position, and the deactivated grid position is activated in response. Distinguishing non-selected grid positions from selected grid positions may involve visually de-emphasizing the non-selected grid positions, such as by dimming or obscuring, or highlighting the selected grid positions. An activated grid position may be deactivated if a stop symbol is randomly presented in the grid position. Game play may be repeated until all activated grid positions are deactivated grid positions and/or de-emphasized grid positions. A currently deactivated and/or de-emphasized grid position may be re-activated in response to the direction-indicating symbol being presented in an adjacent grid position.

40 Claims, 14 Drawing Sheets

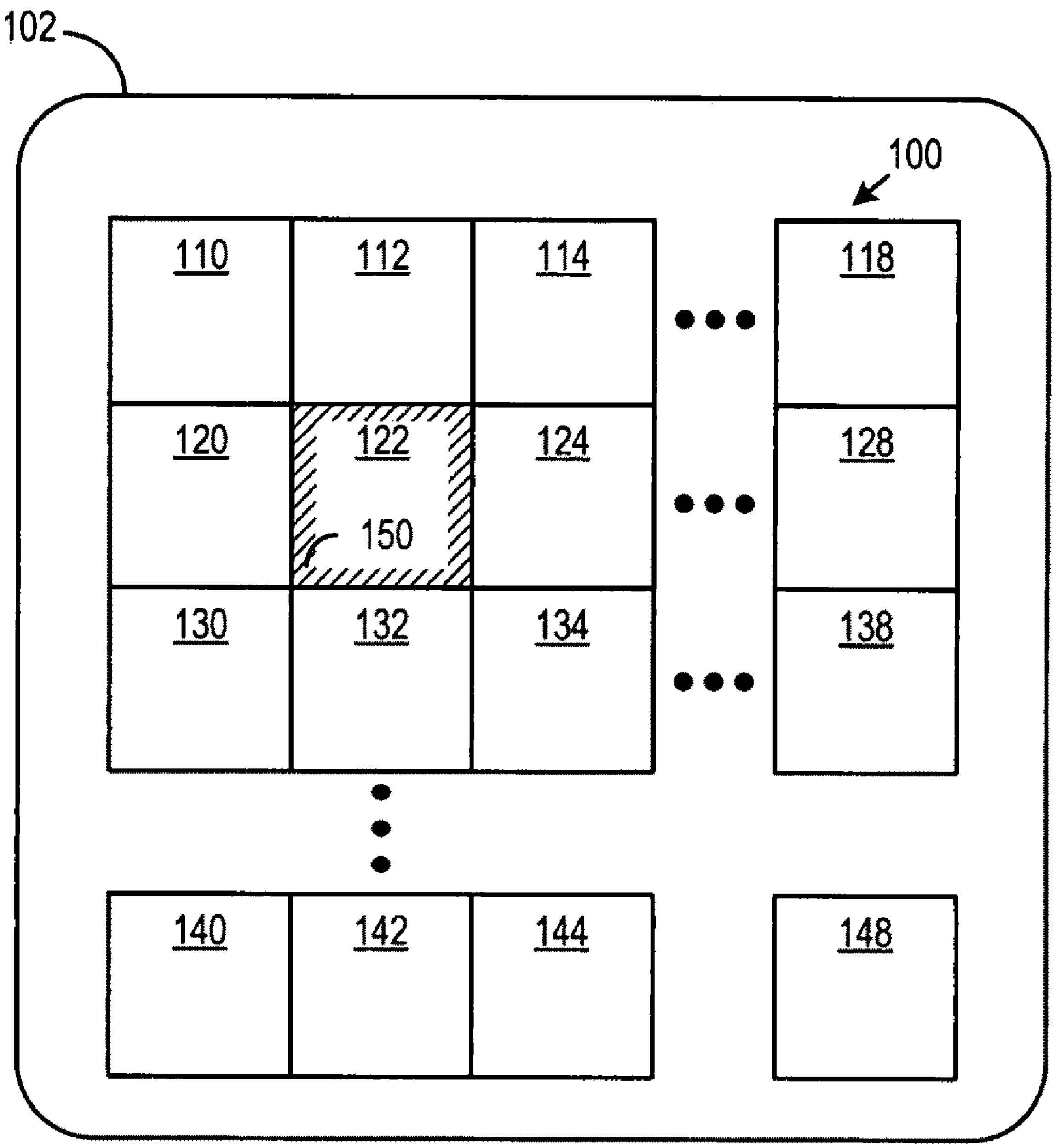
*FIG. 1-A*

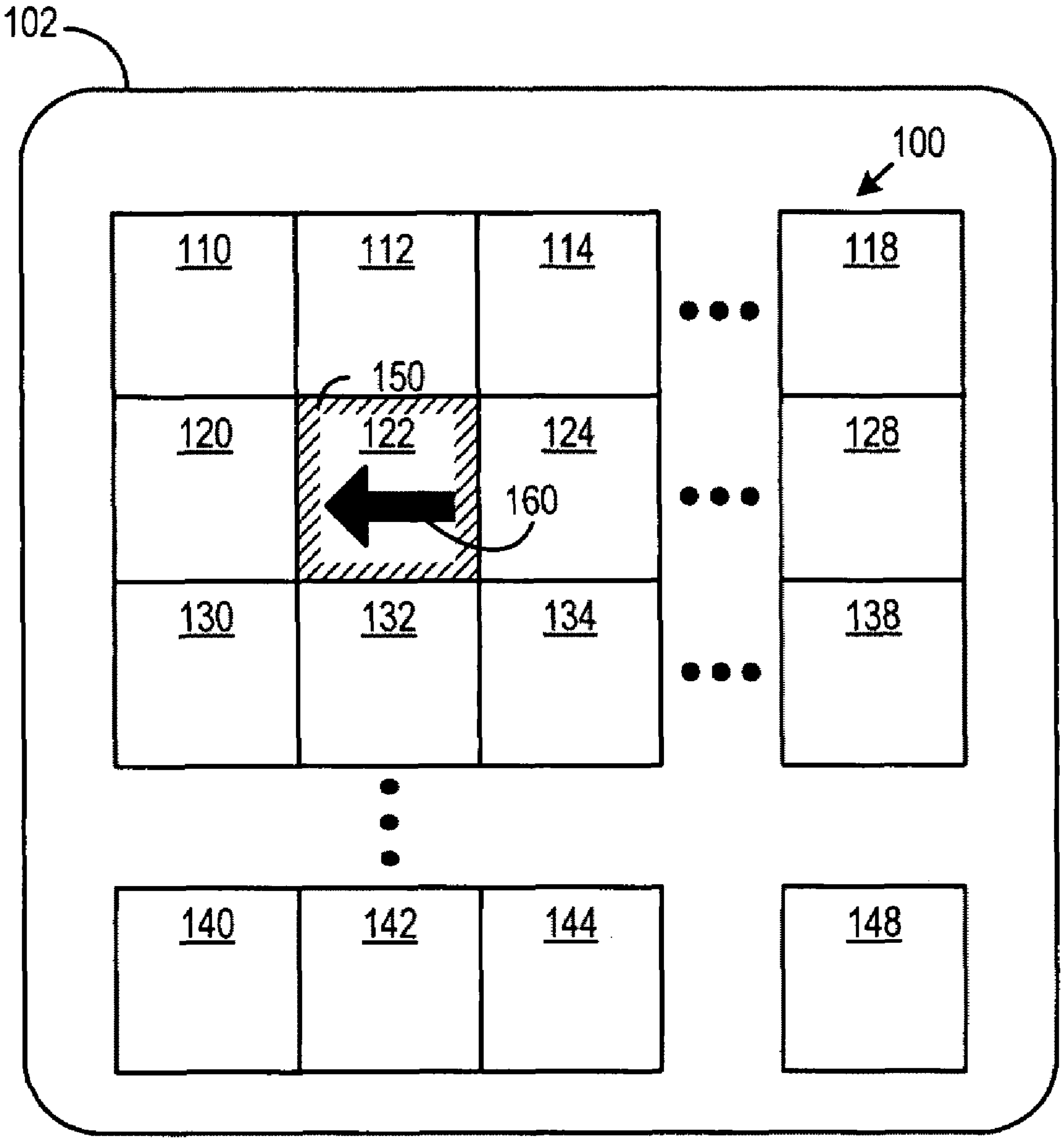
*FIG. 1-B*

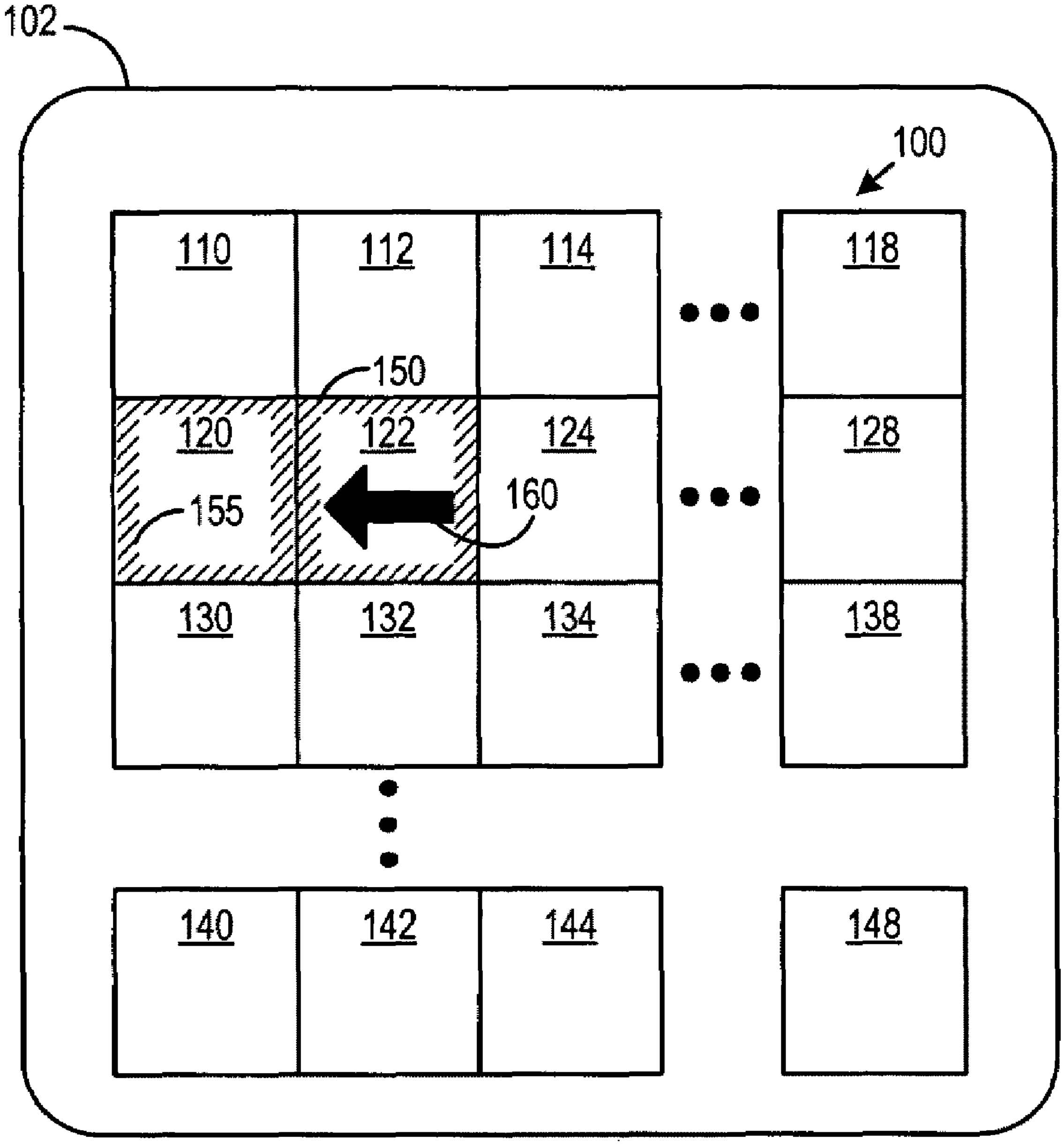
*FIG. 1-C*

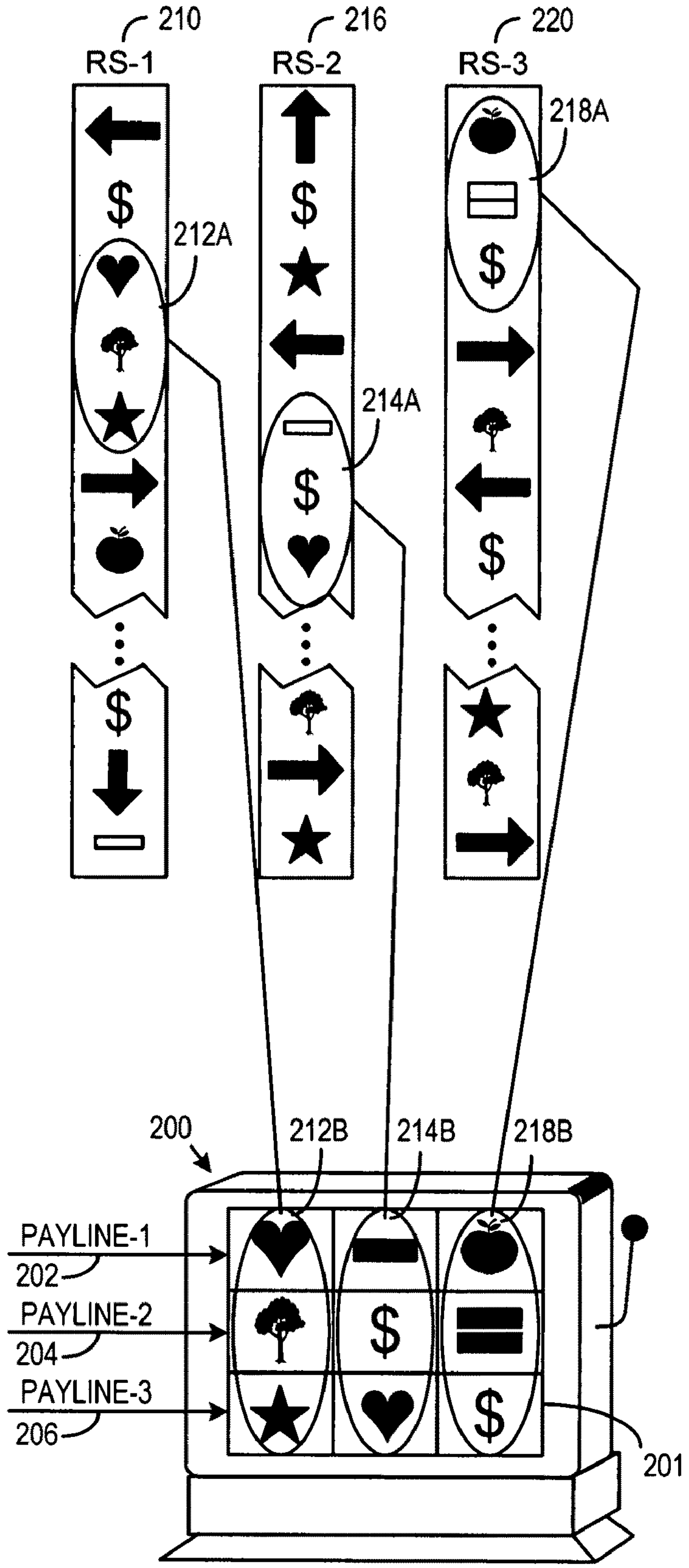
STANDARD MODE
*FIG. 2-A*

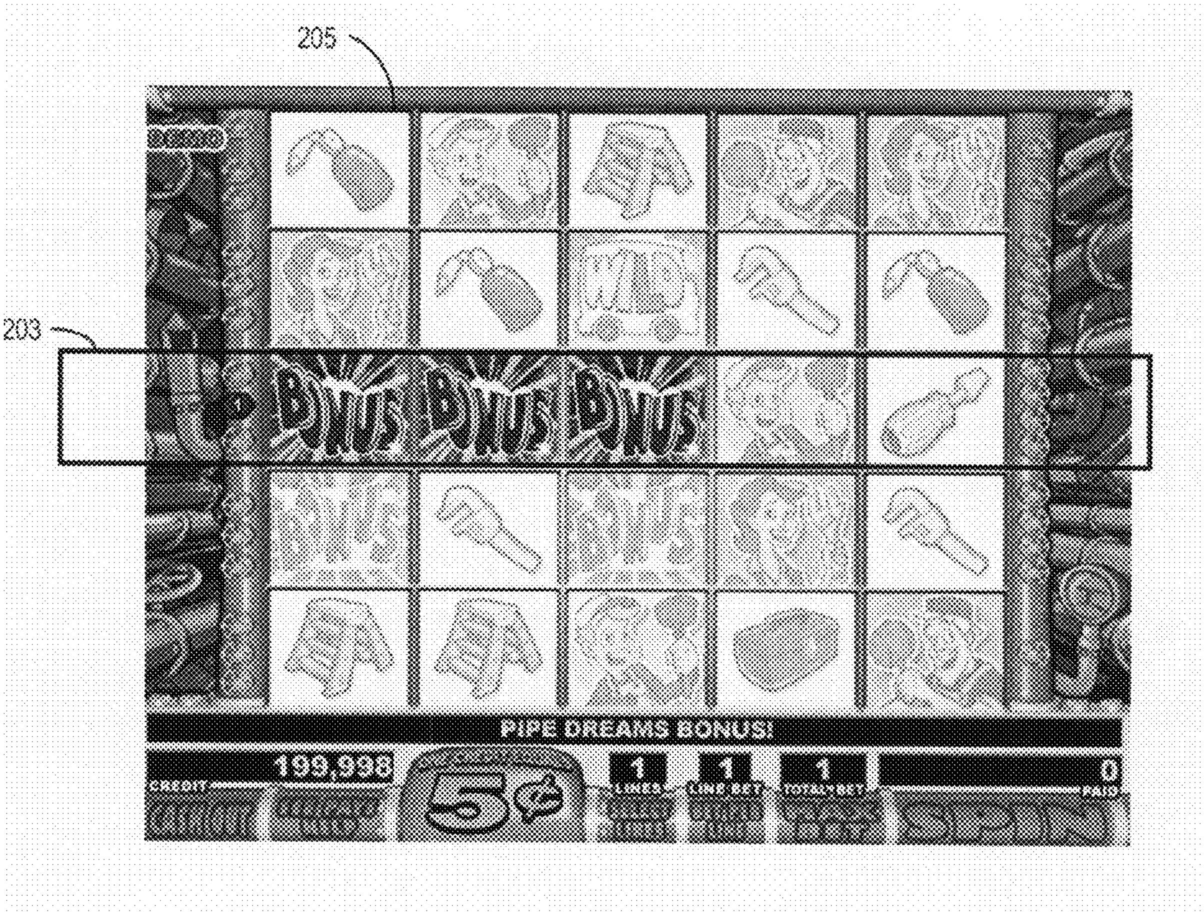
*FIG. 2-B*

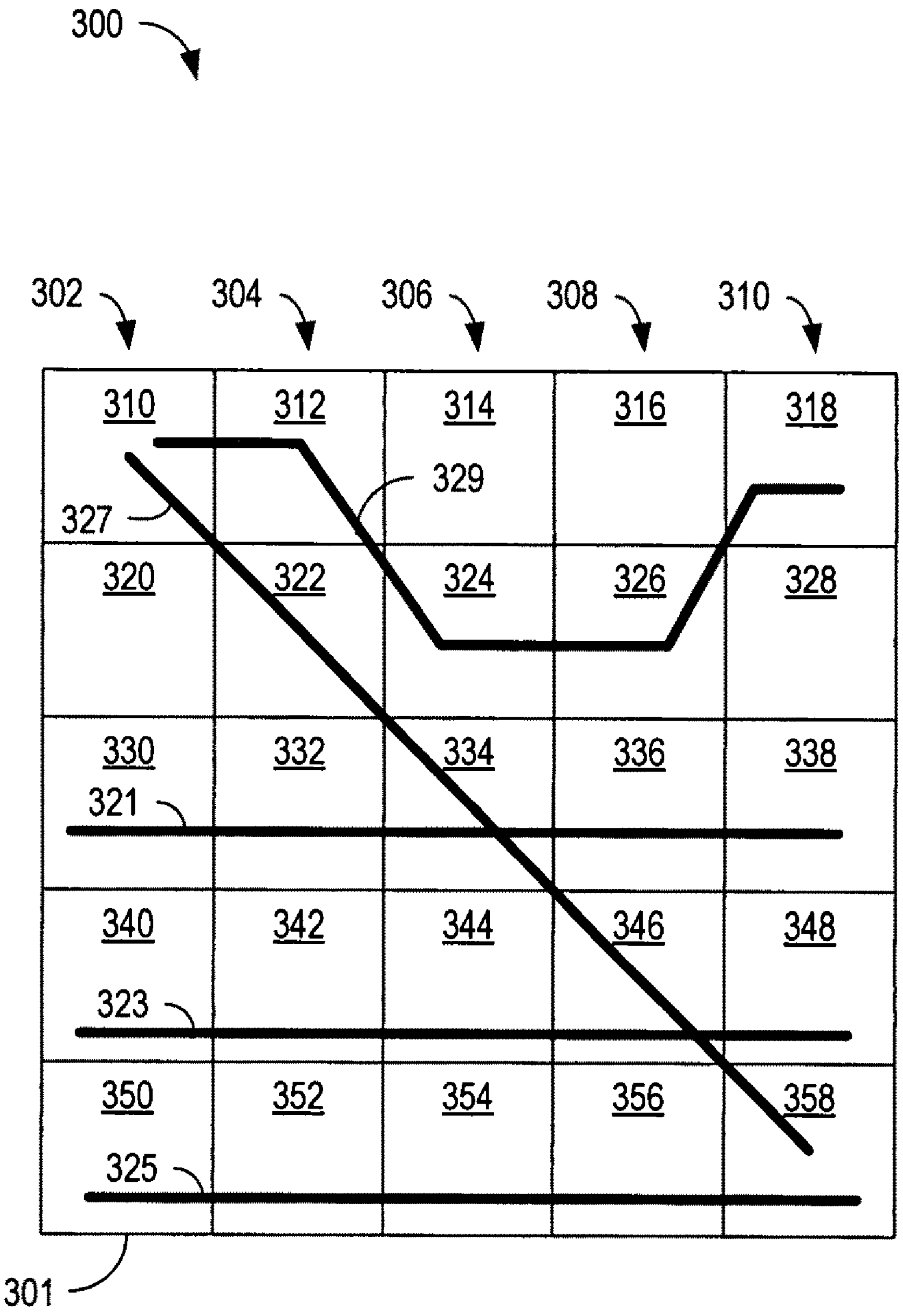
FIG. 3-A

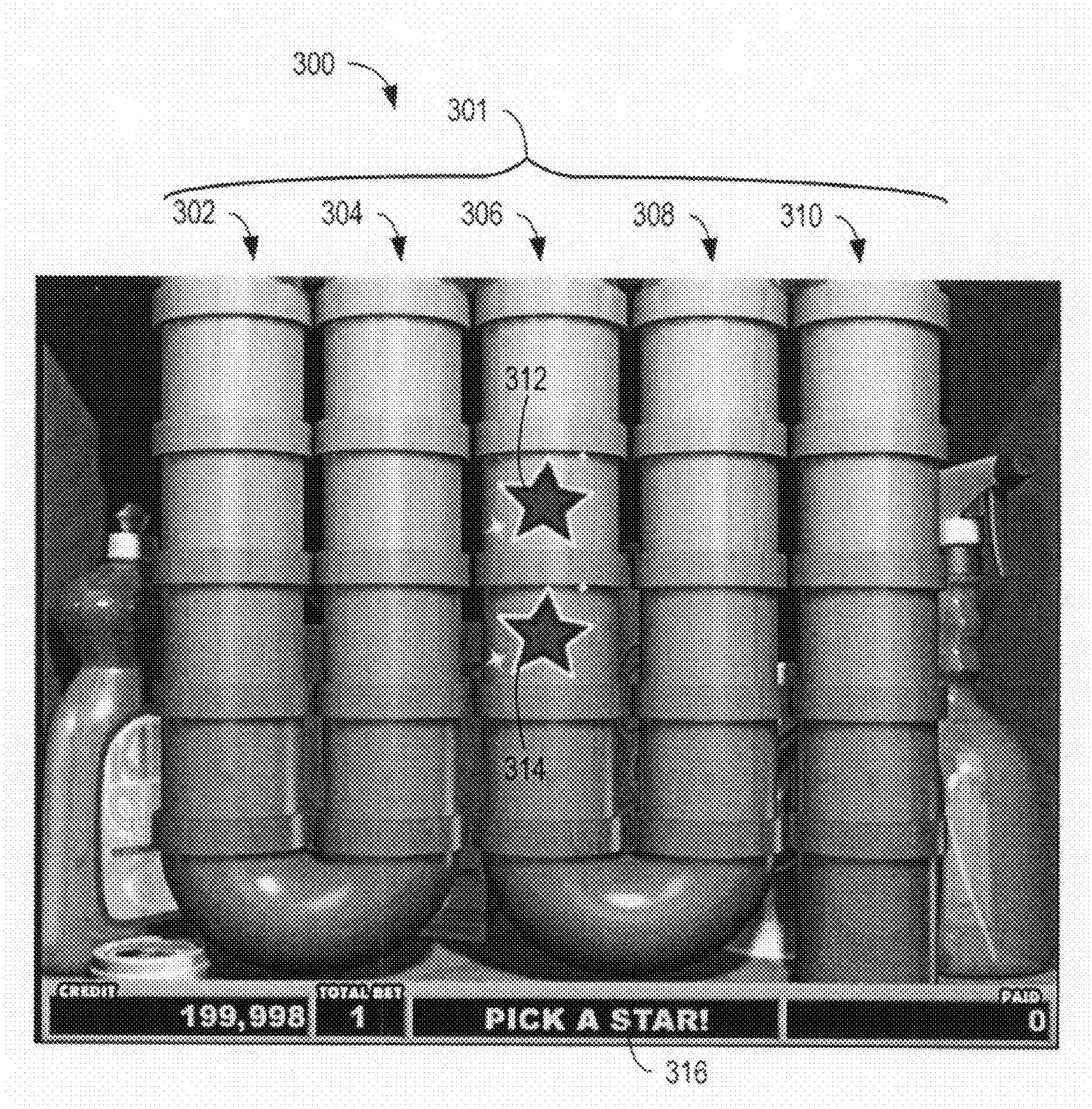
*FIG. 3-B*

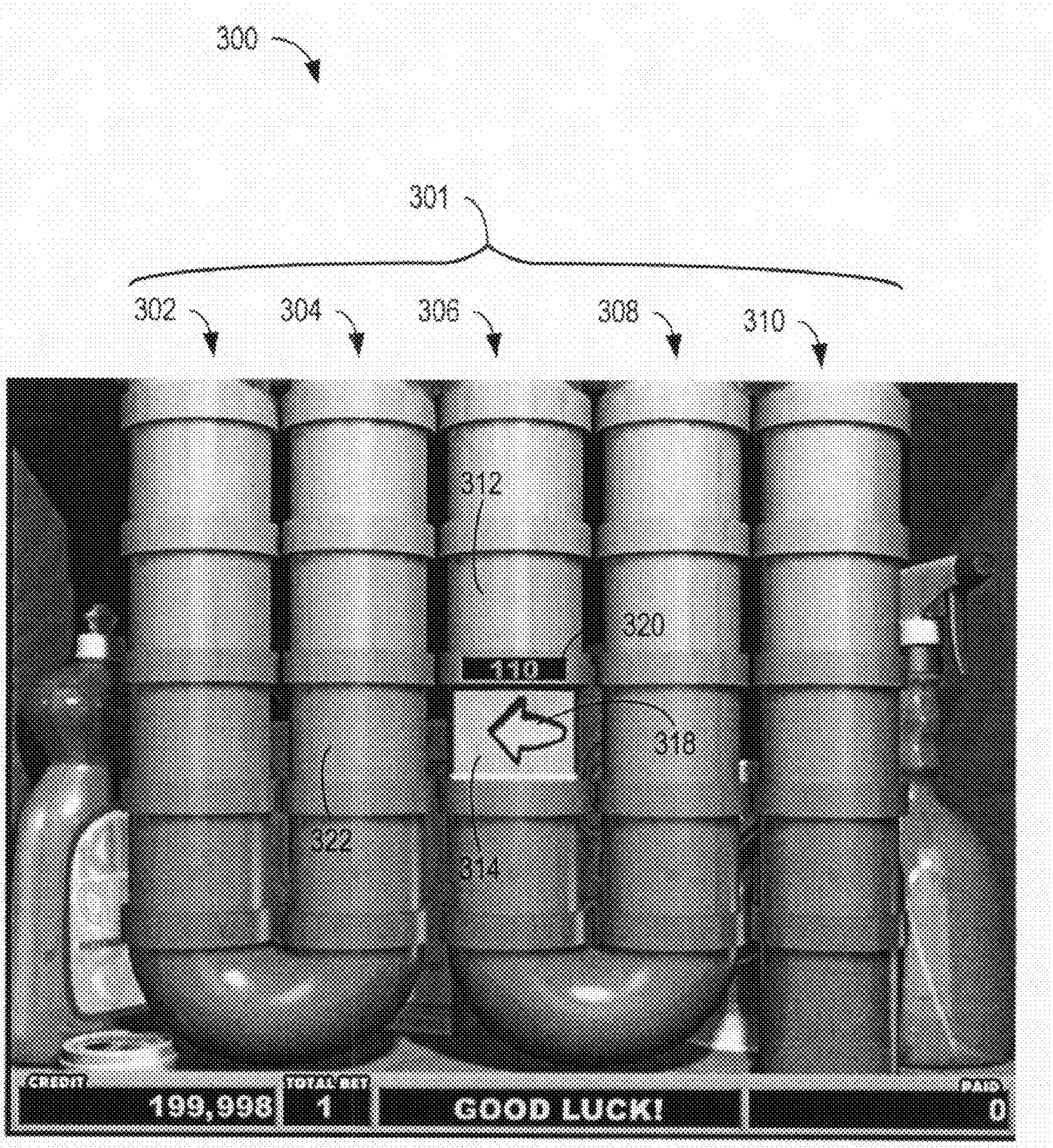
*FIG. 3-C*

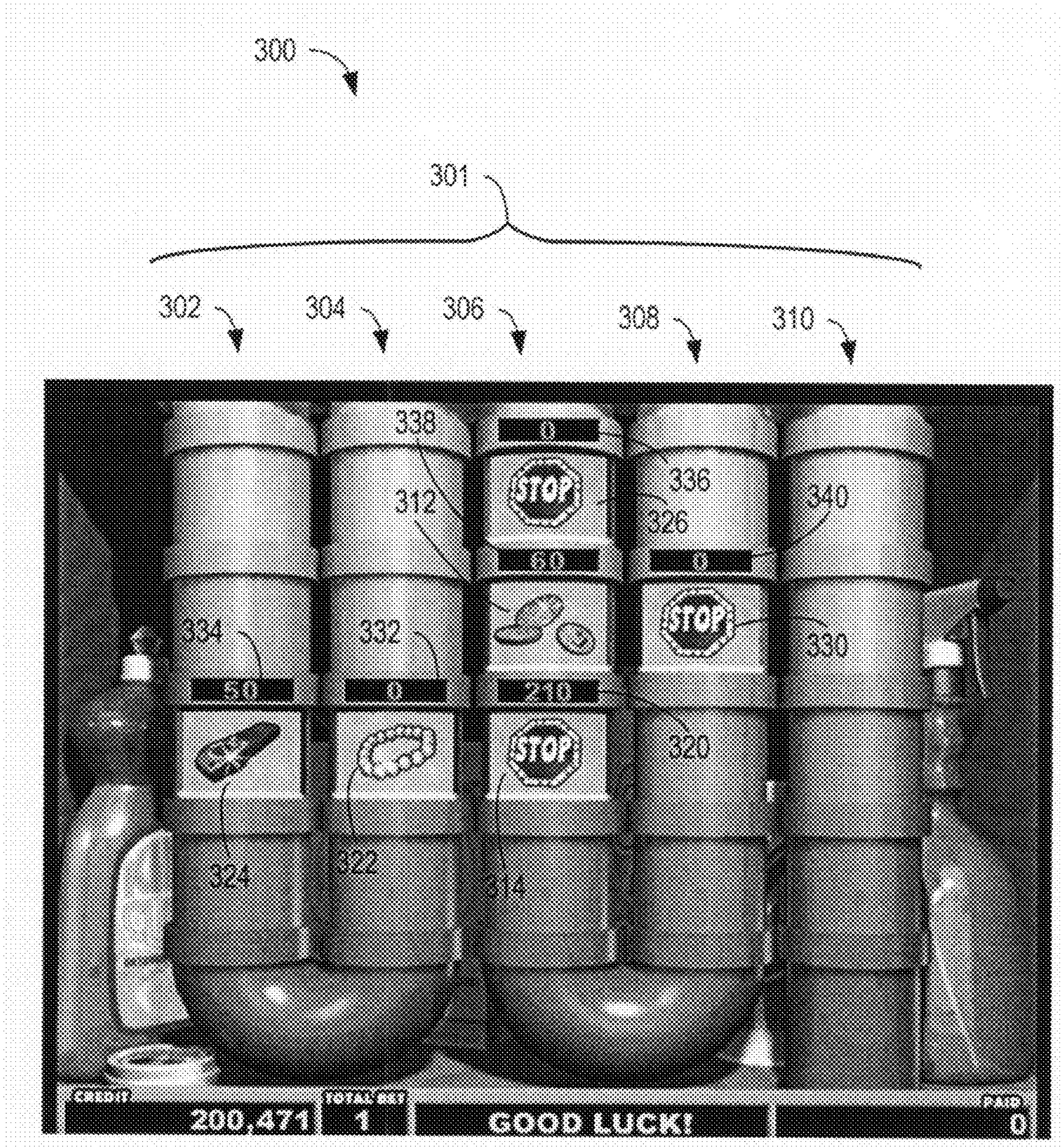
*FIG. 3-D*

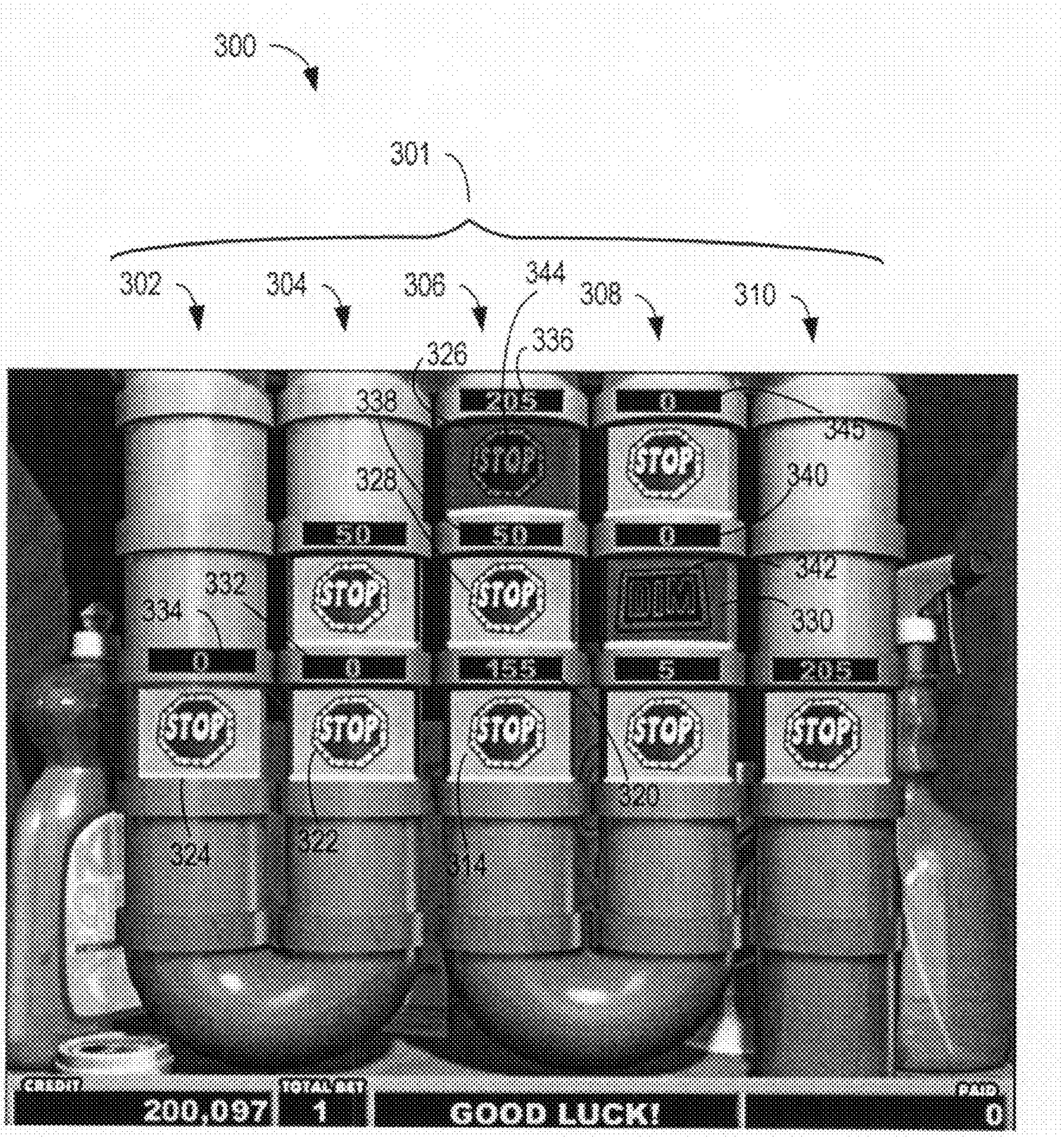
*FIG. 3-E*

GAMING USING DISPLAY ELEMENTS ACTIVATED BY DIRECTION INDICATORS

RELATED APPLICATIONS

This application claims the benefit of Provisional Application No. 60/772,742, filed on Feb. 13, 2006, to which priority is claimed pursuant to 35 U.S.C. §119(e), and which is hereby incorporated herein by reference in its entirety.

FIELD OF THE INVENTION

This invention relates in general to gaming systems and processes, and more particularly to gaming systems and processes employing display elements that are activated by direction-indicating symbols from adjacent display elements.

COPYRIGHT NOTICE

A portion of the disclosure of this patent document contains or may contain material subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming devices such as slot machines have been in use in the U.S. for over a century. Notwithstanding the similarity of the symbols and reels associated with the slot machines of both today and yesteryear, modern day slot machine implementations are markedly different than their mechanical ancestors. This dramatic implementation disparity results primarily from the advent of computers and video capabilities. These additional capabilities provide for a greater range of implementation possibilities for the creative and innovative games devised by their creators. While it may be true that a primary motivator for people to play gaming devices may be the chance to win monetary or other prizes (in the case of legalized gambling), the intrigue and excitement of playing these newly created machines lures people as well. It is therefore important in the gaming industry that gaming innovations be rolled out to the participating public.

Conventionally, participation in standard slot machines involves initiating the rotation of multiple reels, and allowing the machine to randomly stop the reel rotation such that associated reel symbols line up a payline. If the symbols on that payline correspond to a predetermined symbol combination, the participant wins an amount corresponding to the particular symbol combination. For multi-lined paylines, a coin or other token may be played for any one or more of the available paylines, and each of the paylines may provide a winning payout. When this occurs, the slot machine pays out according to the payoff table posted on the slot machine. The payoff table informs players of the winning symbol combinations for that machine, and what each combination pays based on the number of coins allocated for the spin. If a winning combination occurs, the machine releases money or tokens into a payout chute, or may award the winning amount onto a credit meter for the player. For example, if a player initially wagered three coins and that player won a high payout, that player may receive fifty coins of the same denomination in return, or may receive fifty credits for continued play.

It is a continual effort in the gaming industry to develop ways to attract and captivate players in playing gaming machines, such as slot games. One such manner of stimulating interest and heightening excitement has been through the use of "bonus" events. Bonus events or games are used to attract and keep players at a gaming machine. A bonus game is typically an additional gaming activity that is enabled by a bonus-qualifying signal from an underlying or primary gaming activity. Generally, a predetermined prize-winning combination of symbols in an underlying or primary game may result in the player being awarded one or more bonus games. Often the bonus event has a much higher probability of winning, thereby instilling a great interest by players in being awarded bonus events.

There are various secondary or "bonus" events known in the art. One such bonus event allows the player to depress a bonus spin button to allow the player one or more additional free spins in which a winning payout may be made. Alternatively, additional, discrete bonus reels may be used for the bonus event. In such a case, a particular symbol on any one or more of the reels stopped on a winning line may result in a winning payout. In some bonus activities, the reels may be controllable in a bonus play, unlike the underlying primary gaming play. For example, the reels may be individually stopped, and/or the reels may be rotated slower to allow the player to attempt to stop the reel such that the prize-winning symbol stops on the win line. In another example, a bonus event for a video slot machine may have a second screen where the player is rewarded with a bonus game, such as allowing the player to pick one of five different items on the second screen, and the selected item reveals a value won by the player. In recent times, bonus events have become increasingly captivating, sometimes leading the player through video animations that provide visual and audio entertainment while providing clever ways in which the participant can receive payouts of varying quantities. After engaging in the bonus event, play resumes in the underlying, primary gaming machine.

Of these different types of bonus activities, one type includes those bonus activities where the participant is allowed to actively participate in the bonus event. For example, participants may be allowed to make some sort of selection in order to make the participant feel as though he or she has in some way contributed to the ultimate result. While this may be desirable for some participants, others are more intrigued by the random nature of gaming devices, and may seek an exciting manner of engaging in bonus activities without having to figure out how to best play such a bonus round. This participant sentiment may become increasingly prevalent where the bonus activity is entirely different from the original, standard play of the game. For example, a standard slot machine may have a bonus activity where an animated series of events takes place, and the participant must try to figure out how to effectively play the bonus round. As some bonus activities become more and more elaborate, some participants may be put off by the inherent complexities.

Another problem with prior art bonus activities is that there is conventionally an understood "end" of the bonus activity that is sure to occur. For example, in a bonus round where a participant is allowed to select six of twenty-four hidden bonus amounts, the bonus round ends when the amounts associated with the six selections have been made and credited to the participant. While it may be exciting for the participant to engage in such a bonus round, it is largely due to the participant's knowledge that the bonus round is likely to produce greater payout amounts than during standard play. However, it would be desirable in the gaming industry to provide bonus activity that is terminated based on random events, where although statistically bound, can theoretically continue indefinitely.

The present invention recognizes the strong desirability of bonus activities in today's gaming industry, and addresses the aforementioned and other concerns and shortcomings of present bonus activities. The present invention provides gaming participants with an intelligible gaming activity, which may be employed as a primary and/or secondary (i.e. bonus) activity, while providing an exciting, visually appealing experience for the participant.

SUMMARY OF THE INVENTION

To overcome limitations in the prior art described above, and to overcome other limitations that will become apparent upon reading and understanding the present specification, the present invention discloses a gaming activity and a manner of providing and participating in such a gaming activity. The present invention is directed to gaming systems and processes, and more particularly to gaming systems and processes employing display elements that are activated by direction-indicating symbols from adjacent display elements.

An embodiment of a slot game event in accordance with the present invention provides a display grid having two or more deactivated grid positions and at least one activated grid position. A direction-indicating symbol is randomly presented in the at least one activated grid position, the direction-indicating symbol indicating the direction of a deactivated grid position. The deactivated grid position indicated by the direction-indicating symbol is activated in response to the presentation of the direction-indicating symbol in the activated grid position.

Further embodiments in accordance with the present invention involve distinguishing non-selected grid positions from selected grid positions, and awarding a payout for the presented symbols in each enabled grid position that is selected. Distinguishing non-selected grid positions from selected grid positions may involve visually de-emphasizing the non-selected grid positions, such as by dimming or obscuring, or highlighting the selected grid positions, for example.

An activated grid position may be deactivated in accordance with the present invention if a stop symbol is randomly presented in the grid position. The steps of randomly presenting the direction-indicating symbol in the at least one activated grid position, activating the deactivated grid position indicated by the direction-indicating symbol, and deactivating an activated grid position if a stop symbol is randomly presented in the grid position, may be designated as a game play. The game play may be repeated until all activated grid positions are deactivated grid positions and/or de-emphasized grid positions.

In other embodiments, a currently deactivated and/or de-emphasized grid position may be re-activated in response to the direction-indicating symbol being presented in an adjacent grid position to the currently deactivated grid position and indicating the direction of the currently deactivated grid position in a game play subsequent to the deactivation of the currently deactivated grid position.

Other embodiments of a gaming method in accordance with the present invention involve presenting a display grid having a plurality of grid positions, and defining one or more of the positions as enabled grid positions. A symbol may be presented in at least one enabled grid position, the symbol randomly selected from a set of symbols including at least one stop symbol and at least one direction-indicating symbol. A grid position adjacent to each direction-indicating symbol presented in an enabled grid position, in a direction identified by the respective direction-indicating symbol, may be enabled. An enabled grid position may be disabled if the stop symbol is presented in the grid position.

The steps of presenting, enabling, and disabling may occur within a game play, and the game play may be repeated until all enabled grid positions are disabled. A payout may be awarded for the presented symbols in each enabled grid position associated with a payout award for each game play. Each enabled grid position may spin in each game play. A currently disabled grid position may be re-enabled in response to the direction-indicating symbol being presented in an adjacent grid position to the currently disabled grid position, and indicating the direction of the disabled grid position. A currently disabled grid position having a predetermined geographic relationship to a currently enabled grid position may be re-enabled in response to the direction-indicating symbol being presented in the enabled grid position, and indicating the direction of the disabled grid position.

Deactivation of a currently enabled grid position may occur in response to presenting a deactivation symbol in the currently enabled grid position during a game play, and a payout may be awarded for the presented symbols in each enabled grid position that is not deactivated for each game play. Deactivated grid positions may be identified by dimming the grid position, for example. The symbols randomly selected for display in the enabled grid positions may be selected from a set of symbols including left, right, up, and down as direction-indicating symbols.

A gaming system in accordance with embodiments of the present invention includes a means for providing a display grid having a plurality of deactivated grid positions and at least one activated grid position. A means for randomly presenting a direction-indicating symbol in the at least one activated grid position is provided with the system, the direction-indicating symbol useful for indicating the direction of a deactivated grid position. A means for activating the deactivated grid position indicated by the direction-indicating symbol is also provided. The randomly presenting means may randomly select the direction-indicating symbol from a set of symbols including at least one stop symbol and at least one direction-indicating symbol. The system further includes a means for deactivating an activated grid position if the stop symbol is presented in the grid position.

Further embodiments in accordance with the present invention involve presenting at least one activated grid position and a plurality of deactivated grid positions and selecting for each activated grid position a symbol from a set of symbols, the set of symbols comprising activator symbols and stopping symbols, each activator symbol indicating a direction. Such embodiments may further include activating and deactivating of grid positions, including deactivating each grid position for which one of the stopping symbols was selected and activating each deactivated grid element that is in the direction indicated by, and adjacent to, each grid position for which one of the activator symbols was selected. Furthermore, the steps of selecting, deactivating and activating can occur within each of one or more game play rounds, each additional game play round being initiated if at least one grid position is currently activated.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with embodiments of the invention.

BRIEF DESCRIPTION OF THE DRAWINGS

The invention is described in connection with the representative embodiments illustrated in the following diagrams.

FIG. 1-A is a representative example of a slot game grid with one activated grid position that may be presented on a slot game display in accordance with various embodiments of the present invention;

FIG. 1-B is a representative example of the slot game grid of FIG. 1-A, having a direction-indicating symbol presented in the activated grid position, indicating an adjacent grid position;

FIG. 1-C is a representative example of the slot game grid of FIG. 1-B, having the adjacent grid position activated;

FIG. 2-A is a block diagram illustrating one embodiment in which physical or virtual reel strips are associated with a slot game in accordance with various embodiments of the present invention;

FIG. 2-B illustrates a game display having a predetermined symbol combination of three BONUS symbols that initiates a bonus activity in accordance with various embodiment of the present invention;

FIG. 3-A illustrates a display screen having a number of video grid positions showing possible exemplary paylines in accordance with various embodiments of the present invention;

FIG. 3-B illustrates a bonus mode display screen indicating two grid positions showing stars indicating selectable grid positions for activation in accordance with various embodiments of the present invention;

FIG. 3-C illustrates the bonus mode display screen of FIG. 3-B, after selection of the bottom star as an activated display element, presentation of a direction-indicating symbol occurs in accordance with various embodiments of the present invention;

FIG. 3-D illustrates the bonus mode display screen of FIG. 3-C, after several rounds of spins in accordance with various embodiments of the present invention;

FIG. 3-E illustrates the bonus mode display screen of FIG. 3-D, after several more rounds of spins in accordance with various embodiments of the present invention;

DETAILED DESCRIPTION OF THE ILLUSTRATED EMBODIMENTS

Figure 4:
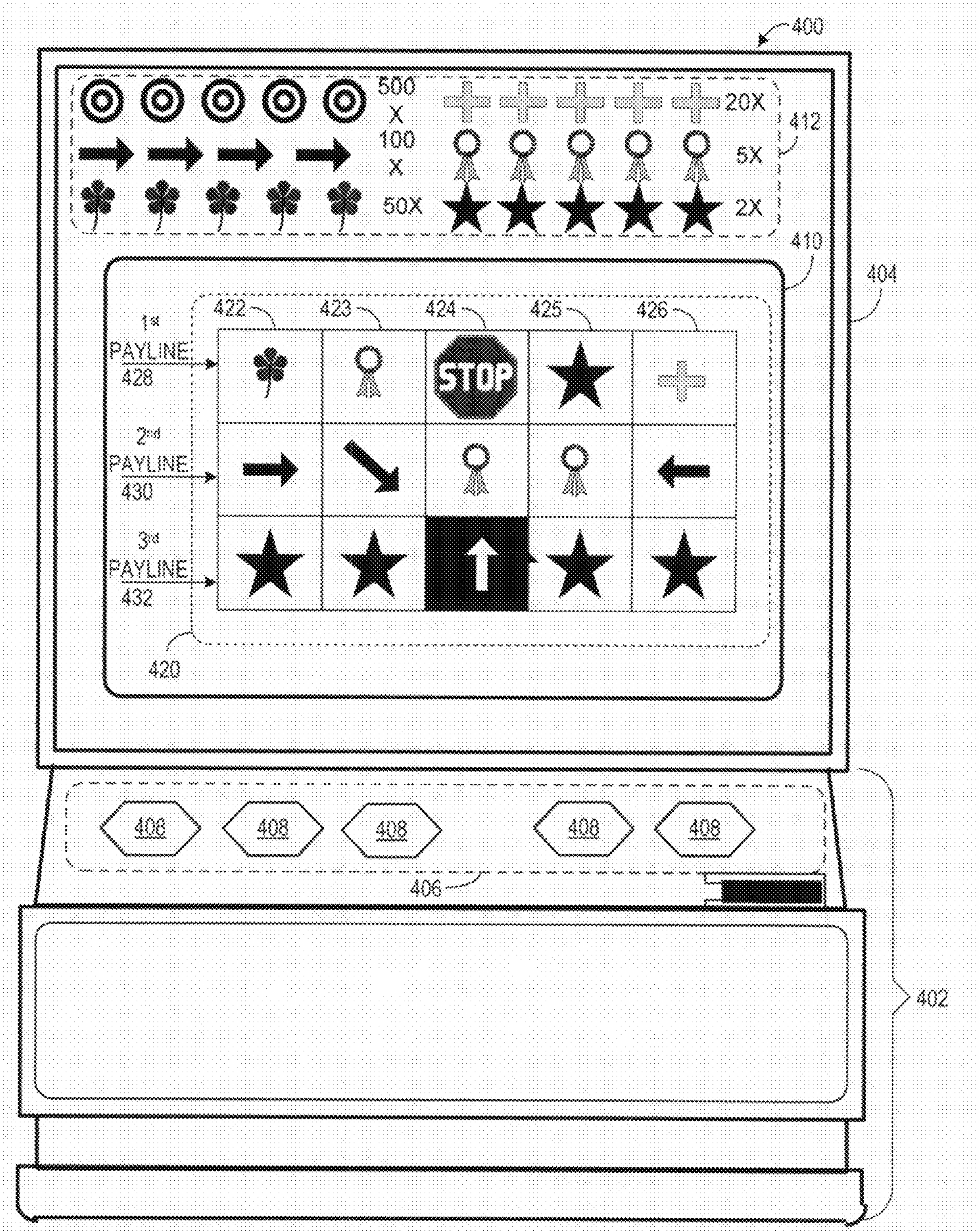
FIG. 4 is an embodiment of a casino-style gaming device in which the principles of the present invention may be applied.

In the following description of the invention, reference is made to the accompanying drawings, which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to a method and apparatus for facilitating participation in a slot game, such as that played on a slot machine or other computing apparatus. In accordance with embodiments of the invention, a gaming method involves presenting a display grid, including mechanical and/or electronic implementations, with a number of grid positions to a game player. The display grid is presented to the game player having two or more deactivated grid positions and at least one activated grid position. During game play, a direction-indicating symbol is randomly presented in activated grid position(s), the direction-indicating symbol indicating the direction of an adjacent grid position. The adjacent grid position is activated in response to the presentation of the direction-indicating symbol.

According to various embodiments of the invention, elements and grid positions in contact with and/or within close proximity to one another can be considered to be adjacent. Elements and grid positions can be in contact with one another by sharing walls, lines, points, segments, portions and/or features. Elements can also be in contact by overlapping each other. Other types of adjacency may be provided as well. For example, in one embodiment, only those elements and/or grid positions that are adjacent in a horizontal, vertical, or diagonal fashion will be deemed "adjacent." Alternatively, only elements or grid positions that are horizontal, and/or that are vertical, and/or that are diagonal, may be deemed adjacent. Elements and grid positions may also be deemed adjacent along opposite edges of the play area, as if the edges were wrapped around to intersect with or contact one another. Three dimensional display grids may also be used in accordance with the invention, such that elements and grid positions sharing a wall, corner or segment may be considered to be adjacent.

Further embodiments in accordance with the present invention involve distinguishing non-selected grid positions from selected grid positions. Distinguishing non-selected grid positions from selected grid positions may involve visually de-emphasizing the non-selected grid positions, such as by dimming or obscuring, and/or highlighting the selected grid positions, for example. If, during game play, a direction-indicating symbol is randomly presented in an activated grid position(s) and indicates the direction of a de-emphasized grid position, the de-emphasized grid position is re-activated and/or re-emphasized in response to the presentation of the direction-indicating symbol.

An activated grid position may be deactivated in accordance with various embodiments of the present invention if a stop symbol is randomly presented in the grid position. A stop symbol may be any symbol predetermined to effect the deactivation, disabling and/or de-emphasization of a grid position upon presentation. Game play may continue without player interaction by repeatedly randomly presenting the direction-indicating symbol in the at least one activated grid position, activating the deactivated grid position indicated by the direction-indicating symbol, and deactivating an activated grid position if a stop symbol is randomly presented in the grid position. The game play may be repeated until all activated grid positions are deactivated grid positions, disabled grid positions and/or de-emphasized grid positions.

In various embodiments of the present invention, a currently deactivated, disabled and/or de-emphasized grid position may be re-activated in response to a direction-indicating symbol being presented in an adjacent grid position to the currently deactivated grid position and indicating the direction of the currently deactivated grid position in a game play subsequent to the deactivation of the currently deactivated grid position. Further embodiments of a gaming method, in accordance with the present invention, involve presenting a display grid having a plurality of grid positions, and defining one or more of the positions as enabled grid positions. A symbol may be presented in at least one enabled grid position, the symbol randomly selected from a set of symbols having at least one stop symbol and at least one direction-indicating symbol. A grid position adjacent to each direction-indicating symbol presented in an enabled grid position, in a direction identified by the respective direction-indicating symbol, may be enabled. An enabled grid position may be disabled if the stop symbol is presented in the grid position.

The steps of presenting, enabling, and disabling may occur within a game play round, and rounds of game play may be repeated until all enabled grid positions are disabled. A payout maybe awarded for the presented symbols in each enabled grid position associated with a payout award for each game play round. Each enabled grid position may spin in each game play round and spins may continue until all enabled grid positions are disabled. A currently disabled grid position may be re-enabled in response to the direction-indicating symbol being presented in a grid position adjacent to the currently disabled grid position, the direction-indicating symbol indicating the direction of the disabled grid position. In another embodiment, a currently disabled grid position having a predetermined geographic relationship to a currently enabled grid position may be re-enabled in response to the direction-indicating symbol being presented in the enabled grid position, and indicating the direction of the disabled grid position.

The present invention, as described more fully below, is applicable to a variety of gaming activities that are played on a gaming machine, including slot games such as reel slots and video slots, electronic poker and other electronic card games, keno, bingo, craps, dice, roulette, etc. The present invention is, however, described in large part in the present description in terms of slot machines to provide an understanding of the invention. For example, in the context of slot games/machines, the present invention allows slot game participants to partake in a standard slot game, while having the opportunity to become engaged in a bonus activity according to the present invention. While the invention is particularly advantageous in the context of slot machines, and while a description in terms of slot machines facilitates an understanding of the invention, the invention is equally applicable to other gaming activities of chance as will be readily apparent to those of skill in the art from the description provided herein.

More particularly, an exemplary gaming system in which the principles of the present invention are particularly beneficial includes at least one standard gaming activity, and at least one bonus activity. For example, in the context of slot machines, a standard gaming activity may include the normal slot game in which the participant places a wager, initiates spinning the mechanical or electronic/video slot game reels, and collects payouts upon the occurrence of one of a plurality of predetermined winning symbol combinations.

A bonus activity is an activity that is often different from the standard gaming activity, and generally occurs only at certain times. In other words, where the standard gaming activity is the gaming activity that is presented to the participant automatically in connection with play of the gaming device, a bonus activity is not automatically presented to the participant. Rather, the bonus activity is generally a special occurrence awarded to the participant for an occurrence resulting from standard gaming play. For example, a bonus event may be awarded to a slot game participant if a resulting symbol combination occurring during standard slot game activity corresponds to a symbol combination determined in advance to result in a bonus event award.

Bonus events are typically used to attract and keep players at a gaming machine that is enabled by a bonus-qualifying signal from an underlying or primary gaming activity. Generally, a predetermined combination of symbols in an underlying game may result in the player being awarded one or more bonus games. Often the bonus event has a much higher probability of winning, thereby instilling a great interest by players in being awarded bonus events.

As is described more fully below, the present invention provides a gaming activity that may be used in connection with a primary gaming activity, and/or a secondary gaming activity such as a bonus event. Thus, while various embodiments of the present invention describe aspects of the invention in connection with a bonus event, those skilled in the art will readily appreciate from the description provided herein that the invention may be utilized in a standard mode of play (e.g., a primary gaming activity/ies), or one or more secondary gaming activities.

In order to provide an understanding of the operation of the invention, FIG. 1-A illustrates a representative example of a slot game grid 100 that may be presented on a slot game display 102. Different slot games may exhibit a variety of different reel characteristics and display formats. For example, some slot games include a conventional three-reel configuration traditionally used in mechanical-reel slot machines. In a three-reel configuration, three reels each having an associated reel strip of symbols rotate vertically as viewed by the participant. The reels stop at random locations, thereby presenting the participant with one or more paylines of potentially winning symbol combinations, depending on the amount wagered by the participant. In more recent times, this traditional reel display format has changed significantly, largely due to the ability to present electronic reels on a display screen. This has resulted in a variety of different reel formats, including greater quantities of vertically rotating electronic reels, greater numbers of paylines, and paylines that are vertical, diagonal, mixed, and/or the traditional horizontal paylines. The present invention is applicable with any reel configuration, including symmetric and asymmetric configurations of reels and/or grids. Therefore, the slot game grid 100 of FIG. 1-A is shown as having an indeterminate number of rows and columns, which can accordingly represent an indeterminate number of reels, paylines, and the like. It should be recognized that the grid may be provided using electronic means such as video, and/or via mechanical means such as physical reels and associated reel strips.

The slot game grid 100 of FIG. 1-A includes a number of rows, which may represent different paylines. However, as will be described more fully below, rows do not necessarily correspond to paylines in accordance with the present invention. Each row includes one or more display segments, herein designated grid positions. The first row includes grid positions 110, 112, 114, through some predetermined number of grid positions represented by grid position 118. Similarly, a second row includes grid positions 120, 122, 124 through 128, and a third row includes grid positions 130, 132, 134 through 138. Depending on the number of grid positions, rows, paylines, etc. desired, additional rows through the final row are provided, where the final row includes grid positions 140, 142, 144 through 148. Thus, FIG. 1-A is intended to represent a generic slot game grid having any number or combination of grid positions.

In accordance with an exemplary embodiment of the present invention, the grid position 122 is illustrated with an indicator 150, useful for indicating that the grid position 122 is activated, enabled, emphasized, or otherwise attributed with specific properties. For discussion purposes, the indicator 150 will be considered to indicate that the grid position 122 is activated. Although the indicator 150 is illustrated as a series of dashed lines, the indicator 150 may be any visual form of distinguishing the grid position 122 as different from one or more other grid positions. Other forms of distinguishing grid positions, for example, include a visual image, an animation, sizing, positioning, lighting, dimming, shading, or other distinguishing feature of the grid positions.

FIG. 1-B is a representative example of the slot game grid of FIG. 1-A, having a direction-indicating symbol 160 randomly presented in the activated grid position 122, indicating the adjacent grid position 120. FIG. 1-C is a representative example of the slot game grid of FIG. 1-B, having the adjacent grid position 120 activated, as illustrated by an indicator 155 highlighting the grid position 120.

In one embodiment of the invention, the standard mode of play may implement a first set of physical or electronic (e.g., virtual) reel strips, and the bonus mode of play may implement a different set of reel strips, where each reel strip provides a symbol set. Further, the standard mode of play may implement physical or virtual reel strips where multiple sequential symbols of the reel strip are provided on multiple paylines during the standard mode of play. For example, referring to FIG. 2-A, a slot machine 200 with display grid 201 is shown in the standard mode of play. In this example, the standard mode includes three paylines with the display grid 201, shown as payline-1 202, payline-2 204, and payline-3 206. The reel strips associated with the standard mode of play may be provided as physical strips having symbols imprinted thereon, such that the stopping point of the reel strip determines which symbols will fall on the paylines 202, 204, 206. For example, a first reel strip, RS-1 210 includes a series of symbols. This reel strip, when stopped, presents a group of symbols on the paylines 202, 204, 206. More particularly, the symbol group 212A is presented across payline-1 202, payline-2 204, and payline-3 206 as seen on the slot machine 200 as symbol group 212B. Analogously, the symbol group 214A of RS-2 216 is presented across paylines 202, 204, 206 as symbol group 214B on the slot machine 200; and the symbol group 218A of RS-3 220 is presented across paylines 202, 204, 206 as symbol group 218B on the slot machine 200. The same may hold true for virtual reel strips, where the order of the symbols on the virtual reel strip may be carried over to the order of the symbols presented across the paylines.

It should be noted that the particular reel strips, number of symbols, and type of symbols presented on the reel strips 210, 216, 220 may differ from one embodiment to the next. For example, each of the reel strips can include a different symbol set altogether, rather than having symbols from a common symbol set such as illustrated in FIG. 2-A. Further, the symbols associated with any of the reel strips may change. For example, after each "spin" in the bonus mode one or more symbols or delineators may be changed, added, and/or removed in order to activate, de-activate, emphasize, de-emphasize, enable, and/or disable grid positions in accordance with the present invention. Further, wild symbols and/or stop symbols may be delineated by indications external to the "reels." In other embodiments of the present invention, the reel strips 210, 216, 234 may continue to use the original symbols, and the activated, enabled, and emphasized grid positions may be presented using, for example, lighting or other method of indication to the player as the game progresses.

A predetermined pattern, number of symbols, or other predetermined symbol configuration may initiate a secondary mode of play, referred to herein as a bonus mode of play or bonus event. The bonus event can be initiated by a certain symbol or symbol combination arising on any of the paylines of the display grid 201, or by a certain predetermined symbol combination arising anywhere on the display grid 201.

In the example of FIG. 2-B, a predetermined symbol combination of three BONUS symbols initiates the bonus activity. These three BONUS symbols are shown on a payline 203 of a display grid 205. It should be noted that in various embodiments of the invention, any predetermined symbol and/or combination of symbols may initiate the bonus activity for a particular embodiment, as well as any number of such symbols arising (e.g., one, two, etc.) Again, for purposes of illustration, three BONUS symbols in adjacent positions on a selected payline trigger the bonus mode in the present example.

FIGS. 3-A through 3-E provide a more particular example in accordance with various embodiments of the invention. In this example, a video display screen 300 is provided. The video display screen may be implemented in a variety of manners, including electronically represented with outputs shown on conventional electronic displays, such as a liquid crystal displays (LCD), dot matrix, plasma, CRT, LED, projection, electro-luminescent display, or generally any type of video display known in the art.

The display screen 300 of the example illustrated in FIGS. 3-A through 3-E, includes a grid 301 including a plurality of video grid positions. In one embodiment, the grid includes five vertical virtual reels 302, 304, 306, 308, and 310 that rotate vertically. However, in a video display environment, the electronic reels need not rotate vertically, but may rotate horizontally along rows, or each grid position may rotate independently of other grid positions. In this example, it is assumed that the electronic reels rotate vertically and in groups defined by reels 302, 304, 306, 308, and 310.

In the standard mode of play, the reels 302, 304, 306, 308, and 310 are electronically rotated. The reels are randomly stopped pursuant to operation of a random number generator (RNG) or other random operation engine. Winning symbol combinations may be presented along a number of different paylines. The example of FIG. 3-A includes five paylines, shown as payline-1 321, payline-2 323, payline-3 325, payline-4 327, and payline-5 329. Additional paylines could be implemented, such as along columns, particularly where the standard mode of play randomly selects symbols at each grid position rather than providing a continuous reel strip for each column. In this example, payline-1 321 includes grid positions 330, 332, 334, 336, and 338. Payline-2 323 includes grid positions 340, 342, 344, 346, and 348. Payline-3 325 includes grid positions 350, 352, 354, 356, and 358. Payline-4 327 includes grid positions 310, 322, 334, 346, and 358. Finally, payline-5 329 includes grid positions 310, 312, 324, 326, and 318.

While the participant may win credits by obtaining predetermined symbol combinations along paylines 321, 323, 325, 327, and 329 during the standard mode of play, the example in accordance with various embodiments of the present invention illustrated in FIGS. 3-A through 3-E also includes a bonus mode of play. Any predetermined symbol criteria may be used to invoke the bonus mode of play. For example, the criteria may be one or more predetermined symbols stopping at predetermined locations in the grid 301. An example is at least one predetermined symbol stopping in each of the reels 302, 304, 306, 308, and 310. Another exemplary criteria are a predetermined number of a predetermined symbol, regardless of where on the grid 301 these predetermined symbols present themselves. As will be readily apparent to those skilled in the art from the foregoing description, a wide variety of options may be implemented to invoke the bonus mode in accordance with embodiments of the invention.

For the particular example illustrated in FIGS. 3-A through 3-E, it is assumed that the criteria used to invoke the bonus mode is that a predetermined symbol type must present itself in each of the reels 302, 304, and 306, however various embodiments of the present invention are not so limited. The example of FIG. 2-B illustrates that such predetermined symbols presented themselves during standard play on payline 203. In various embodiments of the present invention, this invokes the bonus mode of play.

FIG. 3-B illustrates a bonus mode display screen 300 where the vertical virtual reels 302, 304, 306, 308, and 310 are illustrated as five columns of plumbing pipe making up a four-row by five-column version of the grid 301. A grid position 312 and a grid position 314 are presenting stars indicating selectable grid positions for activation in accordance with embodiments of the present invention. A prompt 316 asks the game player to choose one of the grid positions 312 and 314 to activate and start the bonus game play.

FIG. 3-C illustrates the bonus mode grid 301 of FIG. 3-B, after player selection of the bottom star in grid position 314 as an activated display element. Presentation of a direction-indicating symbol 318 occurs in accordance with embodiments of the present invention. A display element 320 may be provided with each grid position to tally the total awards for each activated grid position. The direction-indicating symbol 318 is pointing left in FIG. 3-C, indicating the column 304. In accordance with the particular embodiment of the invention illustrated in FIG. 3-C, a grid position 322 is activated in response to the presentation of the direction-indicating symbol 318 in the grid position 314.

In the particular example illustrated in FIGS. 3-A through 3-E, play continues such that the display screen 300 illustrated in FIG. 3-D is presented after several rounds of spins in accordance with embodiments of the present invention. The illustrated display screen 300 in FIG. 3-D includes six activated grid positions 314, 322, 324, 326, 312, and 330 and their associated display elements 320, 332, 334, 336, 338, and 340. Stop symbols have been presented in the grid positions 314, 326, and 330, indicating that grid positions 314, 326, and 330 are currently deactivated at the time associated with the display screen 300 illustrated in FIG. 3-D (i.e. the particular game play round). The remaining grid positions 322, 324, and 312 are currently activated, and game play continues, either automatically or after input from the player, such as by pressing a button or otherwise indicating the desire to continue play.

FIG. 3-E illustrates the bonus mode display screen 301 of FIG. 3-D, after several more rounds of game play spins in accordance with embodiments of the present invention. In the grid position 330 a DIM symbol 342 has been presented, and the grid position 330 has been visibly dimmed. In this particular embodiment, dimming indicates that the grid position 330 is still active, but will not award any subsequent presentation of normally awarded symbols. A stop symbol 344 is presented in the dimmed grid position 326, and stop symbols are presented in all remaining active grid positions. In accordance with the embodiment of the present invention illustrated in FIGS. 3-A through 3-E, the BONUS round ends and the player is awarded all credits appearing in the display elements 320, 332, 334, 338, 340 and 345 with the exception of the display element 336, which was dimmed at the time of the stopping of the BONUS round.

In various embodiments of the invention, grid positions and/or elements that are dimmed cannot be used to contribute to a payout. In various embodiments of the invention, once a grid position and/or element is dimmed, the symbols appearing in the position or as the element in subsequent game play rounds will not contribute to a payout, but symbols that appeared in the grid position or as the element before the dimming will contribute to a payout. In some other embodiments of the invention, a grid position and/or element that is dimmed will never directly contribute to a payout, regardless of the symbols appearing in or around the dimmed grid position and/or element and further regardless of when the symbols appeared (before or after the dimming). In some other embodiments of the invention, symbols appearing in a grid position and/or as an element may contribute to a payout after being dimmed only if the dimmed grid position and/or element is reactivated. However, various embodiments of the present invention are not so limited and other possible game play processes involving dimming and other concepts will be apparent to one of ordinary skill in the art upon reading this disclosure.

FIG. 4 is an embodiment of a casino-style gaming device in which the principles of the present invention may be applied. Many traditional casino table games may be provided in a "video game" available via a casino-style gaming device shown in FIG. 4. For purposes of explanation, the description of the gaming device in FIG. 4 is provided in terms of a slot machine 400. However, the present invention is analogously applicable to other casino-style games having the ability to include at least one bonus activity.

The slot machine 400 is a structure including at least a computing system, a housing, and a display. The housing includes a base 402 and a display device 404 to allow the slot machine 400 to be a self-supported, independent structure. The base 402 includes structure supporting the slot machine 400, and also includes a user interface 406 to allow the user to control and engage in play of the slot machine 400. The particular user interface mechanisms associated with user interface 406 is dependent on the type of gaming machine. For example, the user interface 406 may include one or more buttons, switches, joysticks, levers, pull-down handles, trackballs, voice-activated input, or any other user input system or mechanism that allows the user to play the particular gaming activity.

The user input 406 allows the user to enter coins or otherwise obtain credits through vouchers, tokens, credit cards, etc. Various mechanisms for entering such vouchers, tokens, credit cards, coins, etc. are known in the art. For example, coin/token input mechanisms, card readers, credit card readers, smart card readers, punch card readers, and other mechanisms may be used to enter wagers. It is through the user input 406 that the user can initiate the standard mode of play, and may optionally control certain aspects of the bonus mode of play.

In the case of a slot machine, the user input may include a plurality of buttons, e.g., buttons 408, which allow the user to enter a number of credits to play, identify the number of paylines in which to participate, cash out, automatically bet the maximum amount and paylines, etc. It should be recognized that a wide variety of other user interface options are available for use in connection with the present invention, including pressing a button on a gaming machine, touching a segment of a touch-screen, entering text, entering voice commands, or other known user entry methodology. The particular user interface mechanism employed is not relevant to the present invention.

The display device 404 includes a display screen 410. The display device may take on a variety of forms depending on what type of presentation is to be provided. For example, a slot game area 420 is provided where the standard slot gaming activity is displayed. In this example, the standard slot gaming activity includes five video reels 422, 423, 424, 425, and 426, and three paylines depicted as the 1$^{st}$ payline 428, the 2$^{nd}$ payline 430, and the 3$^{rd}$ payline 432. The grid positions occur at the intersections of each video reel and payline.

Also associated with the display device 404 is an optional winning guide area 412, where information associated with the potential winning symbol combinations of the standard slot game activity may be presented. This area may also provide an indication of the requisite symbols, symbol combinations, symbol locations, etc. that are required to invoke the bonus mode in accordance with embodiments of the invention. This information may be part of the display screen 410, or alternatively may be separate from the display screen 410 and provided directly on a portion of the display device 404 structure itself. For example, a backlit colored panel may be used as the winning guide area 412.

Figure 5:
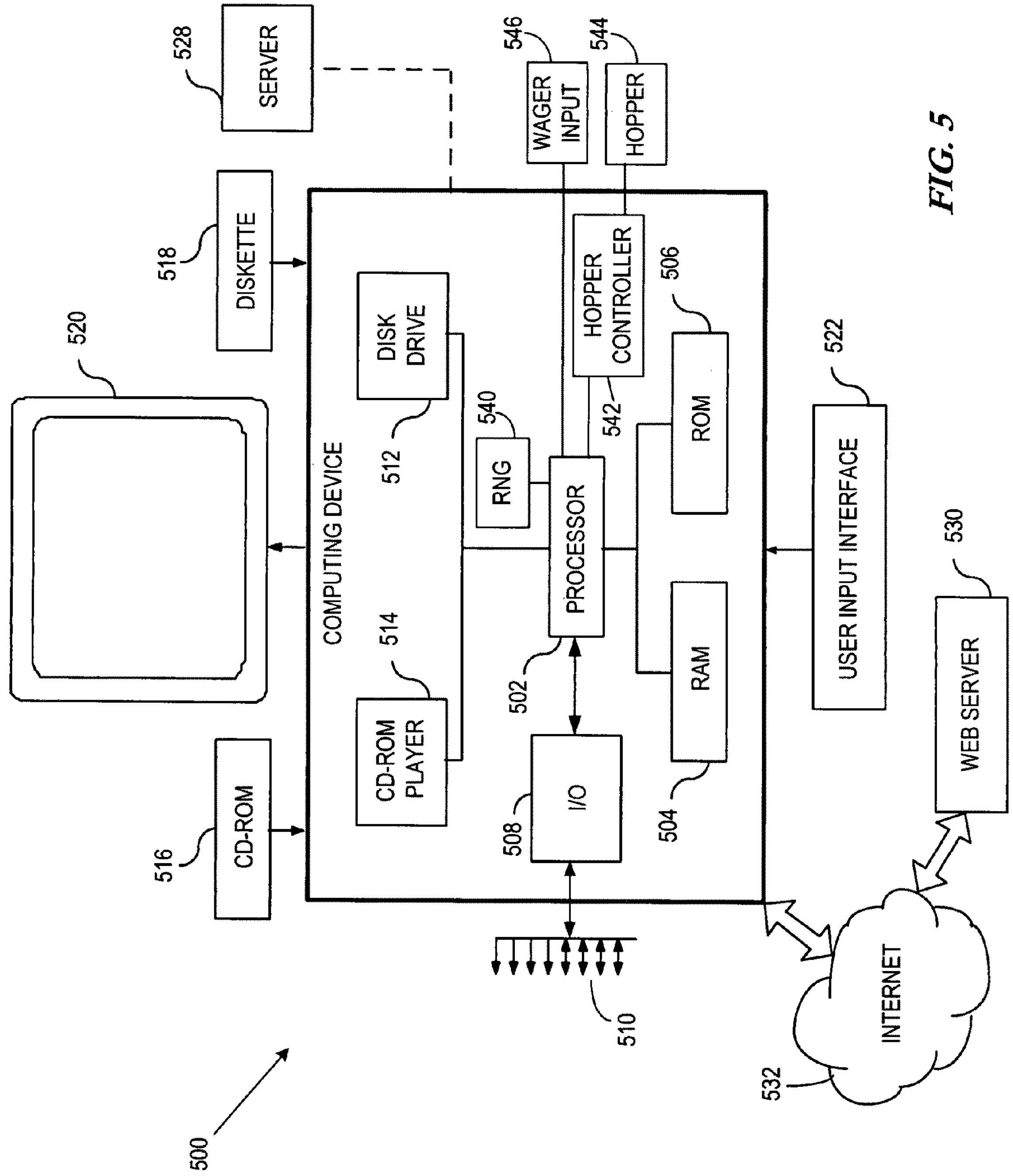
FIG. 5 is a block diagram of a representative computing system capable of carrying out operations in accordance with various embodiments of the present invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with embodiments of the invention is illustrated in FIG. 5.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 500 of FIG. 5 is an example computing structure that can be used in connection with such electronic gaming machines, computers, or other computer-implemented devices to carry out operations of the present invention.

The example computing arrangement 500 suitable for performing the gaming and bonus functions in accordance with the present invention typically includes a central processor (CPU) 502 coupled to random access memory (RAM) 504 and some variation of read-only memory (ROM) 506. The ROM 506 may also be other types of storage media to store programs, such as programmable ROM (PROM), erasable PROM (EPROM), etc. The processor 502 may communicate with other internal and external components through input/output (I/O) circuitry 508 and bussing 510, to provide control signals, communication signals, and the like.

Random numbers and processors govern chance-based gaming systems such as slot machines, in which the present invention is applicable. Electronic reels are used to display the result of the digital reels, which are actually stored in computer memory and "spun" by a random number generator (RNG). RNGs are well known in the art, and may be implemented using hardware, software operable in connection with the processor 502, or some combination of hardware and software.

In accordance with generally known technology in the field of slot machines, the processor 502 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor were one hundred and twenty-eight, the machine would have three remainders ranging from zero to one hundred and twenty-seven. The remainders may be considered as stops on virtual reels. If the divisor were one hundred twenty-eight, then the virtual reels would each have one hundred twenty-eight stops with each stop being equally likely. Each stop on the virtual reel may be mapped to a stop on an actual reel or displayed reel image. These reel images may then be displayed on the display 520.

The present invention is operable using any known RNG, and may be integrally programmed as part of the processor 502 operation, or alternatively may be a separate RNG controller 540. RNGs are well known in the art, and any type of RNG may be implemented for the standard mode of play and/or the bonus mode of play in accordance with embodiments of the invention.

The computing arrangement 500 may also include one or more data storage devices, including hard and floppy disk drives 512, CD-ROM drives 514, and other hardware capable of reading and/or storing information such as DVD, etc. In one embodiment, software for carrying out the standard and bonus gaming operations in accordance with the present invention may be stored and distributed on a CD-ROM 516, diskette 518 or other form of media capable of portably storing information. These storage media may be inserted into, and read by, devices such as the CD-ROM drive 514, the disk drive 512, etc. The software may also be transmitted to the computing arrangement 500 via data signals, such as being downloaded electronically via a network, such as the Internet. Further, as previously described, the software for carrying out the functions associated with the present invention may alternatively be stored in internal memory/storage of the computing device 500, such as in the ROM 506.

The computing arrangement 500 is coupled to the display 520, which represents a display on which the gaming activities in accordance with embodiments of the invention are presented. The display 520 merely represents the "presentation" of the video information in accordance with embodiments of the invention, and may be any type of known display or presentation screen, such as LCD displays, plasma display, cathode ray tubes (CRT), etc. Where the computing device 500 represents a stand-alone or networked computer, the display 520 may represent a standard computer terminal or display capable of displaying multiple windows, frames, etc. Where the computing device is embedded within an electronic gaming machine, such as slot machine 400 of FIG. 4, the display 520 corresponds to the display screen 410 of FIG. 4. A user input interface 522 such as a mouse or keyboard may be provided where the computing device 500 is associated with a standard computer. An embodiment of a user input interface 522 is illustrated in connection with an electronic gaming machine 400 of FIG. 4 as the various "buttons" 408. Other user input interface devices include a keyboard, a mouse, a microphone, a touch pad, a touch screen, voice-recognition system, etc.

The computing arrangement 500 may be connected to other computing devices or gaming machines, such as via a network. The computing arrangement 500 may be connected to a network server 528 in an intranet or local network configuration. The computer may further be part of a larger network configuration as in a global area network (GAN) such as the Internet. In such a case, the computer accesses one or more web servers 530 via the Internet 532.

Other components directed to slot machine implementations include manners of gaming participant payment, and gaming machine payout. For example, a slot machine including the computing arrangement 500 may also include a hopper controller 542 to determine the amount of payout to be provided to the participant. The hopper controller may be integrally implemented with the processor 502, or alternatively as a separate hopper controller 542. A hopper 544 may also be provided in slot machine embodiments, where the hopper serves as the mechanism holding the coins/tokens of the machine. The wager input module 546 represents any mechanism for accepting coins, tokens, coupons, bills, credit cards, smart cards, membership cards, etc. for which a participant inputs a wager amount.

Figure 6:
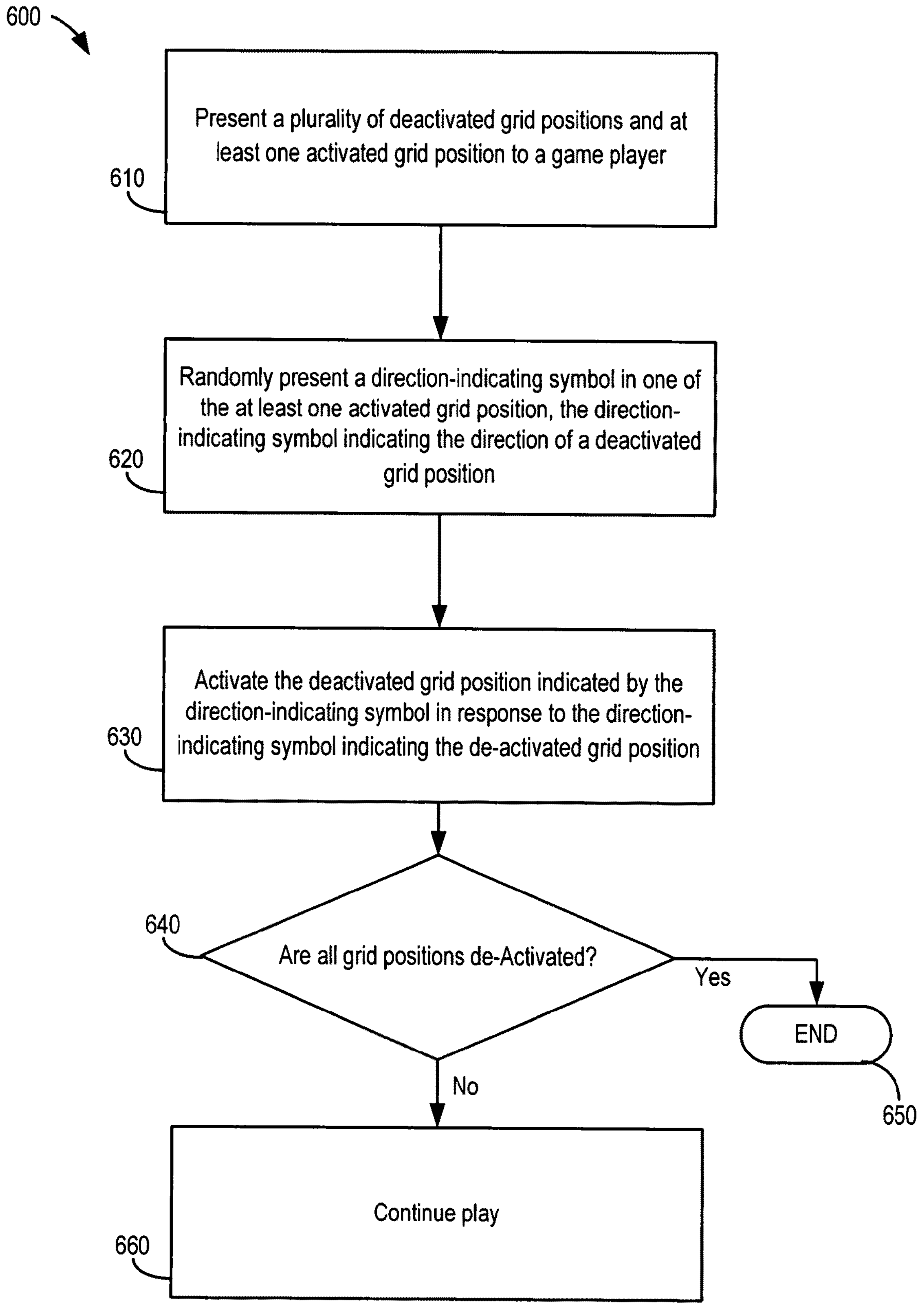
FIG. 6 illustrates a flow chart of a gaming method in accordance with various embodiments of the present invention.

FIG. 6 illustrates a flow chart of a gaming method 600 in accordance with various embodiments of the present invention, which may be implemented in a system and/or machine as described above. The method 600 includes presenting 610 a display grid having a plurality of deactivated grid positions and at least one activated grid position to a game player. A direction-indicating symbol is randomly presented 620 in an activated grid position, the direction-indicating symbol indicating the direction of a deactivated grid position. The deactivated grid position indicated by the direction-indicating symbol is activated 630 in response to the direction-indicating symbol indicating the de-activated grid position. A determination 640 is made to check if all grid positions have been de-activated. If all the grid positions are deactivated, play ends 650. If at least one grid position is still activated, play continues 660. Winning results may be awarded as play continues 660, such as by "spinning the reels" for any currently activated grid positions, until all activated grid positions are de-activated, and the game ends 650.

Figure 7:
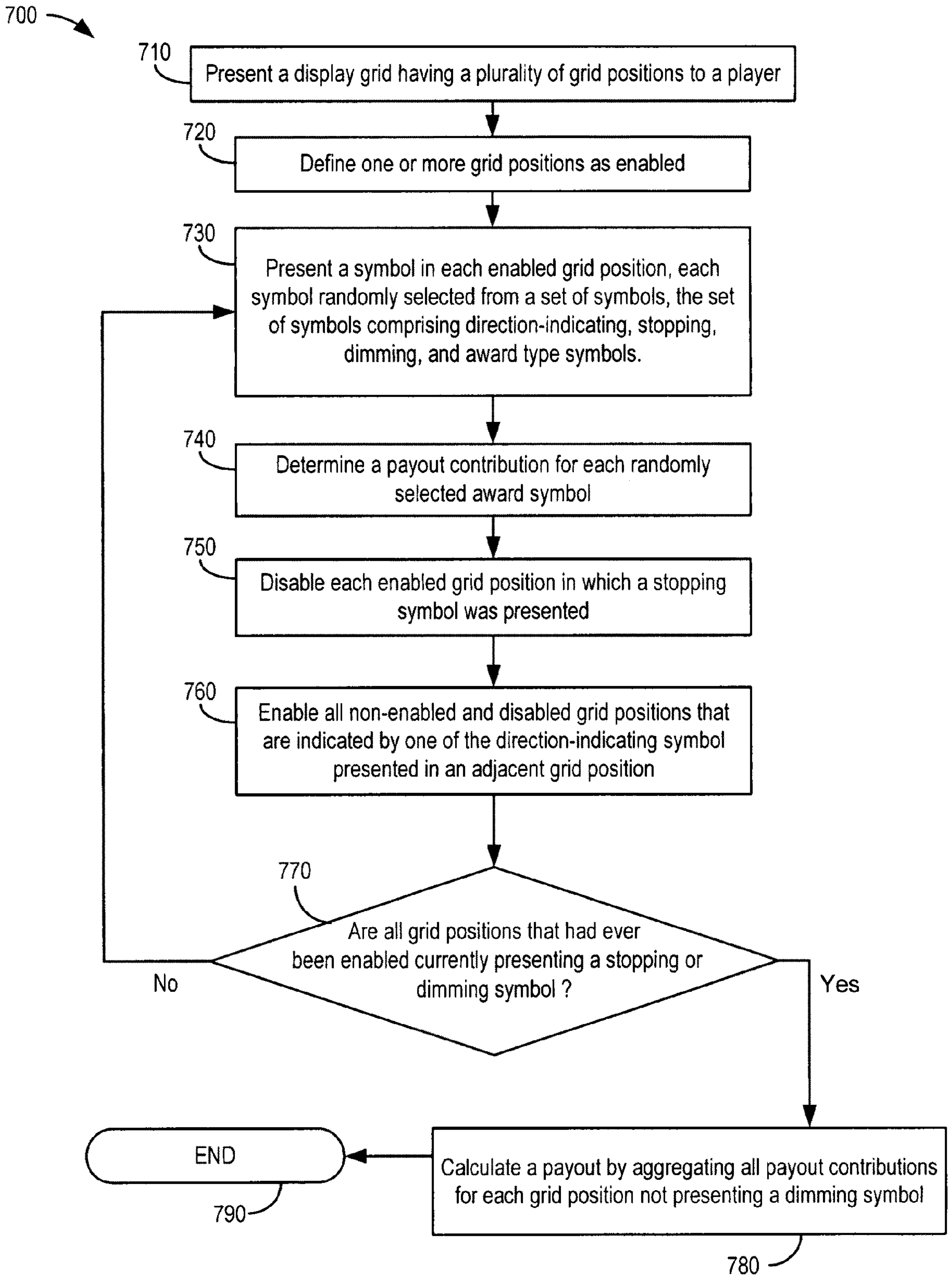
FIG. 7 illustrates a flow chart of another gaming method in accordance with various embodiments of the present invention.

FIG. 7 illustrates a flow chart of a gaming method 700 in accordance with various embodiments of the present invention. The method 700 includes presenting 710 a display grid having a plurality of grid positions to a player. The grid positions could be arranged in any number of horizontal rows and any number of vertical columns, however the present invention is not so limited and different arrangements of grid positions, as they are known in the art, are also contemplated. While this particular embodiment describes an arrangement of grid positions, elements can also be used without departing for the scope of the present invention.

The method 700 further includes defining 720 one or more grid positions as enabled. The particular grid positions that are enabled could be randomly selected, user selected, or selected according to a pre-made plan (e.g. one or more grid positions are always enabled at the start of each game).

The method 700 further includes presenting 730 a symbol in each enabled grid position, each symbol randomly selected from a set of symbols, the set of symbols comprising direction-indicating, stopping, dimming, and award type symbols. Although the particular embodiment of the method 700 includes direction-indicating, stopping, dimming, and award type symbols, more of fewer types of symbols maybe used in various embodiments of the invention. Moreover, in various embodiments of the invention, each type of symbol may include subtypes. For example, up symbols, down symbols, left symbols, right symbols, above symbols, below symbols, diagonal left-above symbols, diagonal left-below symbols, etc. may be presented as subtypes of direction-indicating type symbols. Also, various different types of award symbols maybe presented, each associated with a different award or award amount. Some award symbols may be associated with and/or warrant issuance of an award, either alone or in combination with other award symbols (e.g. a sequence or scatter-pay of corresponding award symbols).

In various embodiments of the invention, each direction-indicating symbol indicates a single direction. In various embodiments of the invention, each direction-indicating symbol indicates only an adjacent grid position and/or symbol positioned relative to the direction that the direction-indicating symbol indicates. For example, in a particular embodiment of the invention, if an above direction-indicating symbol was presented in an enabled grid position and the grid position located immediately above (i.e. adjacent) the enabled grid position is not already enabled (e.g. it is non-enabled, disabled, deactivated and/or de-emphasized), then the grid position located immediately above the enabled grid position presenting the above direction-indicating symbol is enabled.

While various embodiments of the invention have been described as having direction-indicating symbols that indicate only a single direction, various embodiments of the invention are not so limited. For example, a direction-indicating symbol may indicate two or more directions. In such embodiments, the direction-indicating symbol may activate two or more grid positions in a single game play round. In such embodiments, a direction-indicating symbol may indicate two different directions, such as left and right, or it may indicate a general direction, such as all grid positions left of the direction-indicating symbol, regardless of whether each grid position is above or below the direction-indicating symbol. Many other direction-indicating symbol configurations and functions are contemplated within the scope of the invention and will be apparent to one of ordinary skill in the art upon reading this disclosure.

The method 700 further includes determining 740 a payout contribution for each randomly selected award symbol. The payout contribution may be made according to a payout table. While in various embodiments of the invention the presentation of a single award symbol can warrant a payout contribution, in some embodiments of the invention, certain combinations and/or sequences of simultaneously presented award symbols are required for warranting payout contributions. In various embodiments of the invention, even though one or more payout contributions have been determined for a particular grid position, the payout contributions for the particular grid position may not actually be issued to a player if a dimming or otherwise de-emphasizing symbol was also presented in the grid position without the grid position subsequently being re-enabled.

The method 700 further includes disabling 750 each enabled grid position in which a stopping symbol was presented. Disabled grid positions are no longer enabled grid positions, and as a consequence, will not be used to present 730 newly selected symbols in subsequent game play rounds. However, in various embodiments of the invention, disabled grid positions can be re-enabled according to the enabling 760 step, and such re-enabled grid positions can present 730 newly selected symbols in subsequent game play rounds. In various embodiments of the invention, award contributions associated with a particular grid position that is disabled can still be used to contribute to a total payout to a player.

The method 700 further includes enabling 760 all non-enabled and disabled grid positions that are indicated by one of the direction-indicating symbol presented in an adjacent grid position. In various embodiments of the invention, once all grid locations that should be enabled 760 in a particular game play round are enabled, then all presented symbols are cleared from all enabled grid positions. Furthermore, since grid positions presenting stop symbols are disabled, the stopping symbols are not removed. However, in various embodiments of the invention, when a disabled grid position that is presenting 730 a stopping symbol is enabled 760, the stopping symbol is then removed from the now enabled grid position.

The method 700 further includes evaluating 770 whether all grid positions that had ever been enabled are currently presenting a stopping or dimming symbol. If all grid positions that had ever been enabled are currently presenting a stopping or dimming symbol, then the method 700 calculates 780 a payout by aggregating all payout contributions for each grid position not presenting a dimming symbol. In various embodiments of the invention, the method 700 only calculates 780 a payout if all grid positions that had ever been enabled are currently presenting a stopping symbol, and if a grid position is presenting 730 a dimming symbol or is otherwise de-emphasized but not presenting a stopping symbol, then the method returns to the step of presenting 730.

After a payout has been calculated 780, the payout may be issued to a player, invested to an account or bank, and/or used in a subsequent round of game play. After the payout is calculated 780, the game ends 790.

If the evaluation of step 770 determines that not all grid positions that had ever been enabled are currently presenting a stopping or dimming symbol, then a new round of game play is initiated and the method 700 returns to the step of presenting 730.

As one of ordinary skill in the art will understanding upon this disclosure, the steps of 730-770 can be repeated any number of times, increasing and decreasing the number of enabled grid positions that are capable of presenting award symbols each game play round. Disabling and/or enabling grid positions and elements during game play, as described herein, enhances the suspense of game play, for at least the reason that the enabling of grid positions can give the player a sense of winning momentum. Also, because enabling and disabling of grid positions and elements, as described herein, can theoretically continue for an infinite number of rounds while the player accumulates payout contributions, the player can be given the impression of "the sky's the limit," as potentially very large payouts are possible with each game play.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "computer readable medium," "article of manufacture," "computer program product" or other similar language as used herein are intended to encompass a computer program which exists permanently, temporarily, or transitorily on any computer-usable medium such as on any memory device or in any transmitting device.

From the description provided herein, one skilled in the art will be able to combine the software created as described with appropriate general purpose or special purpose computer hardware to create a computer system and/or computer subcomponents embodying the invention, and to create a computing system and/or computer subcomponents for carrying out methods of the invention.

Many modifications and variations are possible in light of the above teaching. For example, the present invention is not limited to what is traditionally known as "slot machines." The present invention is applicable to any gaming device allowing participation in primary and/or secondary gaming activities. Also, while the illustrated embodiments have been described in large part in connection with a "slot machine," other gaming systems and concepts are also within the scope of the invention, such as video poker games, card games, lotteries, and other casino events implementing the appropriate display mechanism.

Further, in embodiments where the invention is implemented in a primary gaming activity or other standard mode of play, such embodiments may be configured to allow the participant to continually engage in such a repeated slot game without entering a bonus mode. In such a case, it may be desirable to reduce the amount of the payouts, adjust the pay table, and alter the probability of presenting stop symbols and/or dimming a position, or otherwise adjusting the probability of winning to maintain desired odds of the gaming device.

As can be seen from the foregoing description, the exemplary embodiments of the invention described herein have been presented for the purposes of illustration and description, and many modifications and variations are possible in light of the above teaching. The description of these exemplary embodiments is not intended to be exhaustive or to limit the invention to the precise form disclosed. It is thus not intended that the scope of the invention be limited with this detailed description, but rather by the claims appended hereto.

What is claimed is:

1. A gaming method for use on an electronic gaming machine, comprising:

presenting, via an electronic display, at least one activated grid position and a plurality of deactivated grid positions;

selecting for each activated grid position a symbol from a set of symbols, the set of symbols comprising activator symbols and stopping symbols, each activator symbol indicating a direction;

for each activated grid position in which an activator symbols is selected, activating each deactivated grid element that is in the direction indicated by, and immediately adjacent to, the respective activated grid position in which the activator symbol is selected; and deactivating any activated grid position for which one of the stopping symbols was selected.

2. The method of claim 1, wherein the set of symbols further comprises award symbols.

3. The method of claim 2, further comprising calculating a payout contribution for each grid position for which an award symbol was selected.

4. The method of claim 1, wherein the set of symbols further comprises at least one de-emphasizing symbol.

5. The method of claim 4, further comprising de-emphasizing each grid position for which one of the de-emphasizing symbols was selected and issuing a payout that is not contributed to by any de-emphasized grid positions.

6. The method of claim 1, wherein the selecting, deactivating and activating occur within each of one or more game play rounds, each subsequent game play round being initiated if at least one grid position is activated at the end of a previous round.

7. The method of claim 3, where the selecting, deactivating, activating and calculating occur within each of one or more game play rounds, each subsequent game play round being initiated if at least one grid position is activated at the end of a previous round.

8. The method of claim 7, further comprising aggregating each payout contribution to determine a total payout.

9. The method of claim 1, wherein each activator symbol is randomly selected from a set of activator symbols, the set of activator symbols comprising up symbols, down symbols, left symbols, and right symbols.

10. The method of claim 9, wherein when one of the up symbol is selected for a grid position, the grid position indicates the adjacent grid position above the grid position, when one of the down symbol is selected for the grid position, the grid position indicates the adjacent grid position below the grid position, when one of the left symbol is selected for the grid position, the grid position indicates the adjacent grid position to the left of the grid position, and when one of the right symbol is selected for the grid position, the grid position indicates the adjacent grid position to the right of the grid position.

11. The method of claim 1, wherein each activated grid position is distinguished from each deactivated grid position by highlighting each activated grid position.

12. A gaming method for use on an electronic gaming machine, comprising:

providing a plurality of deactivated grid positions and at least one activated grid position on an electronic display;

randomly presenting a direction-indicating symbol in the at least one activated grid position, the direction-indicating symbol indicating the direction of a deactivated grid position; and activating the deactivated grid position indicated by the direction-indicating symbol immediately adjacent to the respective activated grid position.

13. The method of claim 12, comprising distinguishing non-selected grid positions from selected grid positions, and awarding a payout for the presented symbols in each enabled grid position that is selected.

14. The method of claim 13, wherein distinguishing comprises visually de-emphasizing the non-selected grid positions.

15. The method of claim 13, wherein distinguishing comprises highlighting the selected grid positions.

16. The method of claim 13, comprising deactivating an activated grid position if a stop symbol is randomly presented in the grid position, wherein the steps of randomly presenting the direction-indicating symbol in the at least one activated grid position, activating the deactivated grid position indicated by the direction-indicating symbol, and deactivating an activated grid position if a stop symbol is randomly presented in the grid position, occur within a game play, and the game play is repeated until all activated grid positions are deactivated grid positions or de-emphasized grid positions.

17. The method of claim 12, comprising deactivating an activated grid position if a stop symbol is randomly presented in the grid position, wherein the steps of randomly presenting the direction-indicating symbol in the at least one activated grid position, activating the deactivated grid position indicated by the direction-indicating symbol, and deactivating an activated grid position if a stop symbol is randomly presented in the grid position, occur within a game play, and the game play is repeated until all activated grid positions are deactivated grid positions.

18. The method of claim 17, comprising re-activating a currently deactivated grid position in response to the direction-indicating symbol being presented in an adjacent grid position to the currently deactivated grid position and indicating the direction of the currently deactivated grid position in a game play subsequent to the deactivation of the currently deactivated grid position.

19. A gaming method for use on an electronic gaming machine, comprising:

defining one or more of a plurality of grid positions on an electronic display as enabled grid positions;

presenting on the electronic display a symbol in at least one of the enabled grid positions, each presented symbol randomly selected from a set of symbols, the set of symbols comprising at least one stop symbol and at least one direction-indicating symbol;

enabling at least one grid position that is indicated by, and immediately adjacent to, one of the at least one direction-indicating symbols; and redefining at least one of the enabled grid positions as a disabled grid position when one of the stop symbols is presented in the enabled grid position.

20. The method of claim 19, wherein the presenting, enabling, and redefining occur within a game play round, and additional game play rounds are initiated until all grid positions that were ever enabled are currently redefined as disabled grid positions.

21. The method of claim 19, wherein the set of symbols further comprises at least one award symbol, each award symbol associated with an award amount.

22. The method of claim 21, further comprising calculating a payout by aggregating all award amounts associated with each award symbol that was presented in one of the plurality of enabled grid positions in each game play round.

23. The method of claim 22, wherein the set of symbols further comprises at least one award nullifying symbol.

24. The method of claim 23, wherein all award amounts associated with a particular grid position will not be aggregated to calculate a payout if one of the award nullifying symbols was also presented in the particular grid position and the particular grid position was not subsequently enabled.

25. The method of claim 24, wherein each award nullifying symbol also redefines the grid position as a disabled grid position.

26. The method of claim 19, comprising redefining a grid position that had been redefined as one of the disabled grid positions as an enabled grid position when an adjacent direction-indicating symbol indicates the grid position.

27. The method of claim 19, wherein each direction-indicating symbol is either a left, right, up, or down symbol.

28. The method of claim 27, wherein each left, right, up and down symbol indicates the respective direction for which it is labeled.

29. A casino gaming apparatus hosting a gaming activity having at least a standard mode of operation and a bonus mode of operation, the casino gaming apparatus comprising:

a display comprising a plurality of deactivated grid positions and at least one activated grid position;

a user interface to facilitate player participation in at least the standard mode of operation; and a processor configured to enter a bonus mode of operation in response to a predetermined symbol combination occurring during the standard mode of operation, the processor configured to conduct one or more rounds of bonus game play, each round of bonus game play comprising:

generating a symbol for each enabled grid position, each generated symbol randomly selected from a set of symbols, the set of symbols comprising at least one direction-indicating symbol and at least one stopping symbol;

deactivating all grid positions for which one of the stopping symbol was generated; and activating all grid positions that are immediately adjacent to, and indicated by, one of the enabled grid positions for which one of the direction-indicating symbol was generated, wherein a next round of bonus game play is initiated for each round of bonus game play that concludes with at least one activated grid position.

30. The casino gaming apparatus of claim 29, wherein the set of symbols further comprises at least one award symbol.

31. The casino gaming apparatus of claim 30, wherein the processor is further configured to calculate a payout contribution for each award symbol that is generated for each enabled grid position during each round of game play.

32. The casino gaming apparatus of claim 31, wherein the set of symbols further comprises a dimming symbol.

33. The casino gaming apparatus of claim 32, wherein the processor is further configured to calculate a payout by aggregating the payout contributions for each round of bonus game play, wherein payout contributions associated with grid positions for which a dimming symbol was generated are not used by the processor in the calculation.

34. A computer-readable medium having computer-executable instructions for executing a chain reaction event in a slot game, the computer-executable instructions performing steps comprising:

presenting a display grid comprising a plurality of grid positions;

defining one or more of the plurality of grid positions as enabled grid positions;

displaying a symbol in at least one enabled grid position, each displayed symbol randomly selected from a set of symbols, the set of symbols comprising at least one deactivating symbol and at least one direction-indicating symbol;

redefining any enabled grid position displaying one of the deactivating symbols as a non-enabled grid position; and enabling each non-enabled grid position that is indicated by, and immediately adjacent to, one of the enabled grid positions displaying one of the direction-indicating symbols, the non-enabled grid position identified by the respective direction-indicating symbol of the enabled grid position.

35. The computer-readable medium of claim 34, wherein each enabled grid position that is not displaying one of the stop symbols or one of the direction-indicating symbols displays an award symbol that is associated with a payout contribution.

36. The computer-readable medium of claim 34, wherein the computer-executable instructions perform further steps comprising repeating the steps of displaying, redefining and enabling each time at least one grid position is presently enabled after performing the steps of displaying, redefining and enabling.

37. The computer-readable medium of claim 34, wherein each directional-indicating symbol indicates a single direction in relation to the enabled grid position in which the directional-indicating symbol is displayed, the non-enabled grid position that is enabled by the direction-indicating symbol positioned in the single direction with respect to the directional-indicating symbol displayed in the enabled grid position.

38. A gaming system, comprising:

means for providing a plurality of deactivated grid positions and at least one activated grid position;

means for randomly presenting a direction-indicating symbol in the at least one activated grid position, the direction-indicating symbol indicating the direction of a deactivated grid position; and means for activating the deactivated grid position indicated by the direction-indicating symbol immediately adjacent to the respective activated grid positions.

39. The gaming system of claim 38, wherein the randomly presenting means randomly selects the direction-indicating symbol from a set of symbols comprising at least one stop symbol and at least one direction-indicating symbol, the system further comprising:

means for deactivating an activated grid position if the stop symbol is presented in the grid position.

40. The gaming method of claim 1, wherein activating each deactivated grid element comprises activating at least one deactivated grid element that is in the direction indicated by, and immediately adjacent to via opposite edges, the respective activated grid positions in which the activator symbol is selected.

* * * * *

UNITED STATES PATENT AND TRADEMARK OFFICE
CERTIFICATE OF CORRECTION

PATENT NO. : 7,674,176 B2
APPLICATION NO. : 11/707256
DATED : March 9, 2010
INVENTOR(S) : Berman et al.

It is certified that error appears in the above-identified patent and that said Letters Patent is hereby corrected as shown below:

<u>In the Claims</u>

Column 18, Claim 1, line 40-41: "symbols" should be --symbol--.

Column 20, Claim 19, line 13: "at least one" should be --any--.

Column 22, Claim 40, line 39: "positions" should be --position--.

Signed and Sealed this

Twentieth Day of July, 2010

David J. Kappos

David J. Kappos
*Director of the United States Patent and Trademark Office*